(12) United States Patent
Suzuki

(10) Patent No.: US 7,508,437 B2
(45) Date of Patent: Mar. 24, 2009

(54) INFORMATION PROCESSING APPARATUS AND METHOD, PROGRAM RECORDING MEDIUM, PROGRAM, AND PICTURE TAKING APPARATUS

(75) Inventor: Yasufumi Suzuki, Tokyo (JP)

(73) Assignee: Sony Corporation (JP)

( * ) Notice: Subject to any disclaimer, the term of this patent is extended or adjusted under 35 U.S.C. 154(b) by 916 days.

(21) Appl. No.: 10/970,649

(22) Filed: Oct. 22, 2004

(65) Prior Publication Data

US 2005/0102637 A1 May 12, 2005

(30) Foreign Application Priority Data

Nov. 6, 2003 (JP) .......................... P2003-376480

(51) Int. Cl.
H04N 5/222 (2006.01)
(52) U.S. Cl. .............................. 348/333.05; 348/333.12
(58) Field of Classification Search .............. 348/231.2, 348/333.05–333.12, 333.02; 715/783
See application file for complete search history.

(56) References Cited

U.S. PATENT DOCUMENTS

| 5,805,215 | A | * | 9/1998 | Mizoguchi ................ 348/231.5 |
| 6,307,550 | B1 | | 10/2001 | Chen et al. |
| 6,313,877 | B1 | * | 11/2001 | Anderson .............. 348/333.05 |
| 6,411,771 | B1 | * | 6/2002 | Aotake ........................ 386/52 |
| 6,606,411 | B1 | * | 8/2003 | Loui et al. .................. 382/224 |
| 2002/0080276 | A1 | * | 6/2002 | Mori et al. .................. 348/553 |

FOREIGN PATENT DOCUMENTS

| EP | 0 619 550 | 10/1994 |
| EP | 0 915 471 | 5/1999 |
| EP | 0 990 996 | 4/2000 |
| JP | 2001-177789 | 6/2001 |
| JP | 2001-229176 | 8/2001 |
| JP | 2001-257926 | 9/2001 |
| JP | 2002-211049 | 7/2002 |
| JP | 2002-290796 | 10/2002 |
| JP | 2003-299028 | 10/2003 |

OTHER PUBLICATIONS

EPO Search Report dated Mar. 9, 2005.
Japanese Office Action; Application No. 2003-376480; Dated: Feb. 2, 2007.

* cited by examiner

Primary Examiner—Nhan T Tran
Assistant Examiner—Mekonnen Dagnew
(74) Attorney, Agent, or Firm—Rader Fishman & Grauer PLLC; Ronald P. Kananen

(57) ABSTRACT

An information processing apparatus according to the present invention includes: an obtaining unit for obtaining picture taking date and time information of data recorded on a recording medium; a range setting unit for setting a data range in which display object data as objects for list display is obtained from within the data on a basis of the picture taking date and time information obtained by the obtaining unit; a picture taking interval calculating unit for obtaining a picture taking interval of each piece of data in the data range set by the range setting unit; a display object setting unit for setting, as the display object data, pieces of data that have longest picture taking intervals obtained by the picture taking interval calculating unit among pieces of data in the data range set by the range setting unit and are not more than a number of images simultaneously displayable on the list display; and a data generating unit for generating list display data including images of the display object data set by the display object setting unit.

15 Claims, 16 Drawing Sheets

FIG 11

| DATA NAME | PICTURE TAKING DATE | PICTURE TAKING TIME | PICTURE TAKING INTERVAL |
|---|---|---|---|
| P001 | 2003/2/22 | 3:21:53 | – |
| P002 | 2003/2/22 | 3:21:58 | 0:00:05 |
| P003 | 2003/2/22 | 3:22:21 | 0:00:23 |
| P004 | 2003/2/22 | 12:25:35 | 9:03:14 |
| P005 | 2003/2/22 | 12:25:40 | 0:00:05 |
| P006 | 2003/2/22 | 12:43:39 | 0:17:59 |
| P007 | 2003/2/22 | 13:02:16 | 0:18:37 |
| P008 | 2003/2/22 | 13:02:22 | 0:00:06 |
| P009 | 2003/2/22 | 13:13:41 | 0:11:19 |
| P010 | 2003/2/22 | 13:18:29 | 0:04:48 |
| P011 | 2003/2/22 | 13:18:34 | 0:00:05 |
| P012 | 2003/2/22 | 13:52:23 | 0:33:49 |
| P013 | 2003/2/22 | 13:52:29 | 0:00:06 |
| P014 | 2003/2/22 | 13:52:34 | 0:00:05 |
| P015 | 2003/2/22 | 14:02:20 | 0:09:46 |
| P016 | 2003/2/22 | 14:09:04 | 0:06:44 |
| P017 | 2003/2/22 | 14:09:09 | 0:00:05 |
| P018 | 2003/2/22 | 14:41:14 | 0:32:05 |
| P019 | 2003/2/22 | 14:41:16 | 0:00:02 |
| P020 | 2003/2/22 | 14:41:19 | 0:00:03 |
| P021 | 2003/2/22 | 16:32:42 | 1:51:23 |
| P022 | 2003/2/22 | 16:32:44 | 0:00:02 |
| P023 | 2003/2/22 | 18:55:25 | 2:22:41 |
| P024 | 2003/2/22 | 18:55:36 | 0:00:11 |
| P025 | 2003/2/22 | 18:55:40 | 0:00:04 |
| P026 | 2003/2/22 | 18:55:44 | 0:00:04 |
| P027 | 2003/2/22 | 19:03:56 | 0:08:12 |
| P028 | 2003/2/22 | 19:04:00 | 0:00:04 |
| P029 | 2003/2/22 | 19:04:04 | 0:00:04 |

141

| P004 | P006 | P007 |
| P009 | P012 | P015 |
| P018 | P021 | P023 |

FIG 12

| DATA NAME | PICTURE TAKING DATE | PICTURE TAKING TIME | PICTURE TAKING INTERVAL | FIRST TIME | SECOND TIME | THIRD TIME | FOURTH TIME | FIFTH TIME |
|---|---|---|---|---|---|---|---|---|
| P001 | 2003/2/22 | 3:21:53 | — | — | — | — | — | — |
| P002 | 2003/2/22 | 3:21:58 | 0:00:05 | 0 | 0 | 0 | 0 | 0 |
| P003 | 2003/2/22 | 3:22:21 | 0:00:23 | 0 | 0 | 0 | 0 | 0 |
| P004 | 2003/2/22 | 12:25:35 | 9:03:14 | 1 | 1 | 1 | 1 | 1 |
| P005 | 2003/2/22 | 12:25:40 | 0:00:05 | 0 | 0 | 0 | 0 | 0 |
| P006 | 2003/2/22 | 12:43:39 | 0:17:59 | 0 | 1 | 1 | 1 | 1 |
| P007 | 2003/2/22 | 13:02:16 | 0:18:37 | 0 | 1 | 1 | 1 | 1 |
| P008 | 2003/2/22 | 13:02:22 | 0:00:06 | 0 | 0 | 0 | 0 | 0 |
| P009 | 2003/2/22 | 13:13:41 | 0:11:19 | 0 | 1 | 0 | 1 | 1 |
| P010 | 2003/2/22 | 13:18:29 | 0:04:48 | 0 | 1 | 0 | 0 | 0 |
| P011 | 2003/2/22 | 13:18:34 | 0:00:05 | 0 | 0 | 0 | 0 | 0 |
| P012 | 2003/2/22 | 13:52:23 | 0:33:49 | 1 | 1 | 1 | 1 | 1 |
| P013 | 2003/2/22 | 13:52:29 | 0:00:06 | 0 | 0 | 0 | 0 | 0 |
| P014 | 2003/2/22 | 13:52:34 | 0:00:05 | 0 | 0 | 0 | 0 | 0 |
| P015 | 2003/2/22 | 14:02:20 | 0:09:46 | 0 | 1 | 0 | 1 | 1 |
| P016 | 2003/2/22 | 14:09:04 | 0:06:44 | 0 | 1 | 0 | 0 | 0 |
| P017 | 2003/2/22 | 14:09:09 | 0:00:05 | 0 | 0 | 0 | 0 | 0 |
| P018 | 2003/2/22 | 14:41:14 | 0:32:05 | 0 | 1 | 1 | 1 | 1 |
| P019 | 2003/2/22 | 14:41:16 | 0:00:02 | 0 | 0 | 0 | 0 | 0 |
| P020 | 2003/2/22 | 14:41:19 | 0:00:03 | 0 | 0 | 0 | 0 | 0 |
| P021 | 2003/2/22 | 16:32:42 | 1:51:23 | 1 | 1 | 1 | 1 | 1 |
| P022 | 2003/2/22 | 16:32:44 | 0:00:02 | 0 | 0 | 0 | 0 | 0 |
| P023 | 2003/2/22 | 16:55:25 | 2:22:41 | 1 | 1 | 1 | 1 | 1 |
| P024 | 2003/2/22 | 18:55:36 | 0:00:11 | 0 | 0 | 0 | 0 | 0 |
| P025 | 2003/2/22 | 18:55:40 | 0:00:04 | 0 | 0 | 0 | 0 | 0 |
| P026 | 2003/2/22 | 18:55:44 | 0:00:04 | 0 | 0 | 0 | 0 | 0 |
| P027 | 2003/2/22 | 19:03:56 | 0:08:12 | 0 | 1 | 0 | 1 | 0 |
| P028 | 2003/2/22 | 19:04:00 | 0:00:04 | 0 | 0 | 0 | 0 | 0 |
| P029 | 2003/2/22 | 19:04:04 | 0:00:04 | 0 | 0 | 0 | 0 | 0 |

INFORMATION PROCESSING APPARATUS AND METHOD, PROGRAM RECORDING MEDIUM, PROGRAM, AND PICTURE TAKING APPARATUS

BACKGROUND OF THE INVENTION

The present invention relates to an apparatus and a method for information processing, a program recording medium, a program, and a picture taking apparatus. Particularly, the invention relates to an apparatus and a method for information processing, a program recording medium, a program, and a picture taking apparatus that enable a desired image to be displayed by a small number of operations.

Conventionally, a picture taking apparatus having taken image (still image or moving image) data, audio data and the like recorded on a recording medium makes a list display of thumbnail images of recorded data (first I-pictures in the case of moving images) as shown in FIG. 1 and FIG. 2. Thereby, desired data can be found from among the many pieces of data recorded on the recording medium.

FIG. 1 shows an example of display of a screen 1 on which thumbnail images are displayed in such a manner as to be arranged two-dimensionally. In the example of FIG. 1, pieces of data 1 to 32 are recorded in order of picture taking date and time on a recording medium 2. The screen 1 displays nine thumbnail images of data recorded on the recording medium 2 in three rows and three columns. The screen 1 is provided with a scroll 11 on a right side of the thumbnail images, which scroll is operated to select data of thumbnail images to be displayed on the screen 1 from among the pieces of data recorded on the recording medium 2.

In the example of FIG. 1, pieces of data 10 to 18 are selected from among the pieces of data 1 to 32 recorded on the recording medium 2 by operation of the scroll 11, and thumbnail images 10 to 18 corresponding to the selected pieces of data 10 to 18 are displayed on the screen 1. Then, a user operates the scroll 11 to scroll the screen 1 up or down while viewing the screen 1. Thereby a range X of the selected data (data 10 to 18 in the example of FIG. 1) is moved to a right or a left on the recording medium 2, and thumbnail images corresponding to the data in the moved and selected range X are displayed on the screen 1.

FIG. 2 shows an example of display of a screen on which thumbnail images are arranged in one vertical column for list display in conjunction with corresponding image information. In FIG. 2, parts corresponding to those in FIG. 1 are identified by corresponding reference numerals, and repeated description thereof will be omitted. In the example of FIG. 2, three thumbnail images corresponding to pieces of data 15 to 17 among pieces of data recorded on a recording medium 2 are displayed in one vertical column on a screen 1. Image information such as a name, picture taking time and the like of each thumbnail image is displayed on a side of the thumbnail image.

Also in the example of FIG. 2, a user operates a scroll 11 to scroll the screen 1 up or down, whereby a range X of the selected data (data 15 to 17 in the example of FIG. 2) is moved to a right or a left on the recording medium 2, and thumbnail images corresponding to the data in the moved and selected range X are displayed on the screen 1.

As described above, the range of display on the screen 1 is limited in the picture taking apparatus and the like. To display thumbnail images of all the data recorded on the recording medium 2, the scroll 11 or the like needs to be used, and a function for the user to operate the scroll 11 is required. In addition, in a case where a large amount of data is recorded on the single recording medium 2, the scroll 11 needs to be operated many times before a thumbnail image of desired data is reached. The case where a large amount of data is recorded on the recording medium 2 will be described in the following with reference to FIG. 3.

In the example of FIG. 3, 96 pieces of data recorded on the recording medium 2 are shown in order of picture taking date and time. Suppose for example that a user desires a thumbnail image of the 85th piece of data X (a hatched part in the figure) from a start of the 96 pieces of data recorded on the recording medium 2 to be displayed on the screen.

First, when the user gives an instruction for list display, nine thumbnail images corresponding to a range Y1 including nine pieces of data from the first piece of data y1 from the start of the recording medium 2 are displayed on a screen 1-1. In the example of FIG. 3, the user operates a scroll 11-1 to scroll the screen 1-1 in a downward direction, whereby the range of the selected data on the recording medium 2 is moved to a range Y2 including nine pieces of data from the 10th piece of data y2 from the start of the recording medium 2. Nine thumbnail images corresponding to the data in the range Y2 selected on the recording medium 2 are displayed on a screen 1-2.

Next, the user operates a scroll 11-2 to scroll the screen 1-2 in a downward direction, whereby the selected data range on the recording medium 2 is moved to a range Y3 including nine pieces of data from the 19th piece of data y3 from the start of the recording medium 2. Nine thumbnail images corresponding to the data in the range Y3 selected on the recording medium 2 are displayed on a screen 1-3. The user operates a scroll 11-3 to scroll the screen 1-3 in a downward direction, whereby the selected data range on the recording medium 2 is moved to a range Y4 including nine pieces of data from the 28th piece of data y4 from the start of the recording medium 2. Nine thumbnail images corresponding to the data in the range Y4 selected on the recording medium 2 are displayed on a screen 1-4. Further, the user operates a scroll 11-4 to scroll the screen 1-4 in a downward direction, whereby the selected data range on the recording medium 2 is moved to a range Y5 including nine pieces of data from the 37th piece of data y5 from the start of the recording medium 2. Nine thumbnail images corresponding to the data in the range Y5 selected on the recording medium 2 are displayed on a screen 1-5.

Similarly, the user operates a scroll 11-5 to scroll the screen 1-5 in a downward direction, whereby the selected data range on the recording medium 2 is moved to a range Y6 including nine pieces of data from the 46th piece of data y6 from the start of the recording medium 2. Nine thumbnail images corresponding to the data in the range Y6 selected on the recording medium 2 are displayed on a screen 1-6. The user operates a scroll 11-6 to scroll the screen 1-6 in a downward direction, whereby the selected data range on the recording medium 2 is moved to a range Y7 including nine pieces of data from the 55th piece of data y7 from the start of the recording medium 2. Nine thumbnail images corresponding to the data in the range Y7 selected on the recording medium 2 are displayed on a screen 1-7. Further, the user operates a scroll 11-7 to scroll the screen 1-7 in a downward direction, whereby the selected data range on the recording medium 2 is moved to a range Y8 including nine pieces of data from the 64th piece of data y8 from the start of the recording medium 2. Nine thumbnail images corresponding to the data in the range Y8 selected on the recording medium 2 are displayed on a screen 1-8.

Similarly, the user operates a scroll 11-8 to scroll the screen 1-8 in a downward direction, whereby the selected data range on the recording medium 2 is moved to a range Y9 including nine pieces of data from the 73rd piece of data y9 from the start of the recording medium 2. Nine thumbnail images corresponding to the data in the range Y9 selected on the recording medium 2 are displayed on a screen 1-9. The user operates a scroll 11-9 to scroll the screen 1-9 in a downward direction, whereby the selected data range on the recording medium 2 is moved to a range Y10 including nine pieces of data from the 82nd piece of data y10 from the start of the recording medium 2. Nine thumbnail images corresponding to the data in the range Y10 selected on the recording medium 2 are displayed on a screen 1-10. Thus, the thumbnail image of the 85th piece of data $\dot{X}$ from the start of the recording medium 2 can finally be displayed at a fourth position from the first thumbnail image on the screen 1-10 after the nine operations of the scroll 11 (displaying the 10 screens).

As described above, when a large amount of data is recorded on one recording medium, the scroll needs to be operated many times before a thumbnail image of desired data is reached. Thus the operation is troublesome.

Accordingly, Patent Document 1 (Japanese Patent Laid-Open No. 2001-177789) proposes a data management method that improves ease of use by dividing pieces of data recorded on a recording medium into groups using picture taking intervals of these pieces of data, and displaying an image of the first piece of data in the groups.

However, when the amount of data recorded on the recording medium is further increased, the above-described data management method requires scroll operation or the like at the time of display after all, thus requiring a function for scrolling.

In addition, the above-described data management method requires manual setting of a picture taking interval serving as a reference for the grouping. The setting is troublesome, and differences in the picture taking interval varying according to the individual and conditions cannot be accommodated.

SUMMARY OF THE INVENTION

The present invention has been made in view of the above, and it is accordingly an object of the present invention to enable display of a desired image by a small number of operations.

According to the first aspect of the present invention, there is provided an information processing apparatus for making list display of data recorded on a recording medium, the information processing apparatus including:

an obtaining unit for obtaining picture taking date and time information of the data recorded on the recording medium;

a range setting unit for setting a data range in which display object data as objects for the list display is obtained from within the data on a basis of the picture taking date and time information obtained by the obtaining unit;

a picture taking interval calculating unit for obtaining a picture taking interval of each piece of data in the data range set by the range setting unit;

a display object setting unit for setting, as the display object data, pieces of data that have longest the picture taking intervals obtained by the picture taking interval calculating unit among pieces of data in the data range set by the range setting unit and are not more than a number of images simultaneously displayable on the list display; and a data generating unit for generating list display data including images of the display object data set by the display object setting unit.

According to the second aspect of the present invention, there is provided an information processing method for making list display of data recorded on a recording medium, the information processing method including:

an obtaining step of obtaining picture taking date and time information of data recorded on the recording medium;

a range setting step of setting a data range in which display object data as objects for the list display is obtained from within the data on a basis of the picture taking date and time information obtained by a process of the obtaining step;

a picture taking interval calculating step of obtaining a picture taking interval of each piece of data in the data range set by a process of the range setting step;

a display object setting step of setting, as the display object data, pieces of data that have longest the picture taking intervals obtained by a process of the picture taking interval calculating step among pieces of data in the data range set by the process of the range setting step and are not more than a number of images simultaneously displayable on the list display; and a data generating step of generating list display data including images of the display object data set by a process of the display object setting step.

According to the third aspect of the present invention, there is provided a program recording medium on which a program for making a computer perform a process for list display of images of image data is recorded, the program including:

an obtaining step of obtaining picture taking date and time information of data recorded on the recording medium;

a range setting step of setting a data range in which display object data as objects for the list display is obtained from within the data on a basis of the picture taking date and time information obtained by a process of the obtaining step;

a picture taking interval calculating step of obtaining a picture taking interval of each piece of data in the data range set by a process of the range setting step;

a display object setting step of setting, as the display object data, pieces of data that have longest the picture taking intervals obtained by a process of the picture taking interval calculating step among pieces of data in the data range set by the process of the range setting step and are not more than a number of images simultaneously displayable on the list display; and a data generating step of generating list display data including images of the display object data set by a process of the display object setting step.

According to the fourth aspect of the present invention, there is provided a program for making a computer perform a process for list display of images of image data, the program including:

an obtaining step of obtaining picture taking date and time information of data recorded on the recording medium;

a range setting step of setting a data range in which display object data as objects for the list display is obtained from within the data on a basis of the picture taking date and time information obtained by a process of the obtaining step;

a picture taking interval calculating step of obtaining a picture taking interval of each piece of data in the data range set by a process of the range setting step;

a display object setting step of setting, as the display object data, pieces of data that have longest the picture taking intervals obtained by a process of the picture taking interval calculating step among pieces of data in the data range set by the process of the range setting step and are not more than a number of images simultaneously displayable on the list display; and a data generating step of generating list display data including images of the display object data set by a process of the display object setting step.

According to the fifth aspect of the present invention, there is provided a picture taking apparatus for making a list display of images of image data recorded on a recording medium, the picture taking apparatus including:

a picture taking unit for photographing a subject;

a recording unit for recording image data of the subject photographed by the picture taking unit onto the recording medium;

an obtaining unit for obtaining picture taking date and time information of the data recorded on the recording medium;

a range setting unit for setting a data range in which display object data as objects for the list display is obtained from within the data on a basis of the picture taking date and time information obtained by the obtaining unit;

a picture taking interval calculating unit for obtaining a picture taking interval of each piece of data in the data range set by the range setting unit;

a display object setting unit for setting, as the display object data, pieces of data that have longest the picture taking intervals obtained by the picture taking interval calculating unit among pieces of data in the data range set by the range setting unit and are not more than a number of images simultaneously displayable on the list display;

a data generating unit for generating list display data including images of the display object data set by the display object setting unit; and a display control unit for controlling display of the list display data generated by the data generating unit.

According to the present invention, it is possible to display a desired image by a small number of operations. Further, according to the present invention, it is possible to display every image without using a scroll bar.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 11 is a diagram of assistance in explaining a display candidate setting process in step S23 in FIG. 10;

FIG. 12 is a diagram of assistance in explaining a concrete example of the display object data setting process in FIG. 10;

DETAILED DESCRIPTION OF THE PREFERRED EMBODIMENTS

The best mode for carrying out the present invention will hereinafter be described. Correspondences between disclosed inventions and embodiments are illustrated as follows. Even when there is an embodiment described in the present specification but not described here as corresponding to an invention, it does not signify that the embodiment does not correspond to the invention. Conversely, even when an embodiment is described here as corresponding to an invention, it does not signify that the embodiment does not correspond to inventions other than that invention.

Further, this description does not represent all inventions described in the specification. In other words, this description does not negate presence of inventions described in the specification but not claimed in the present application, that is, presence of inventions for divisional application or to be presented and added by amendments in the future.

Figure 4:
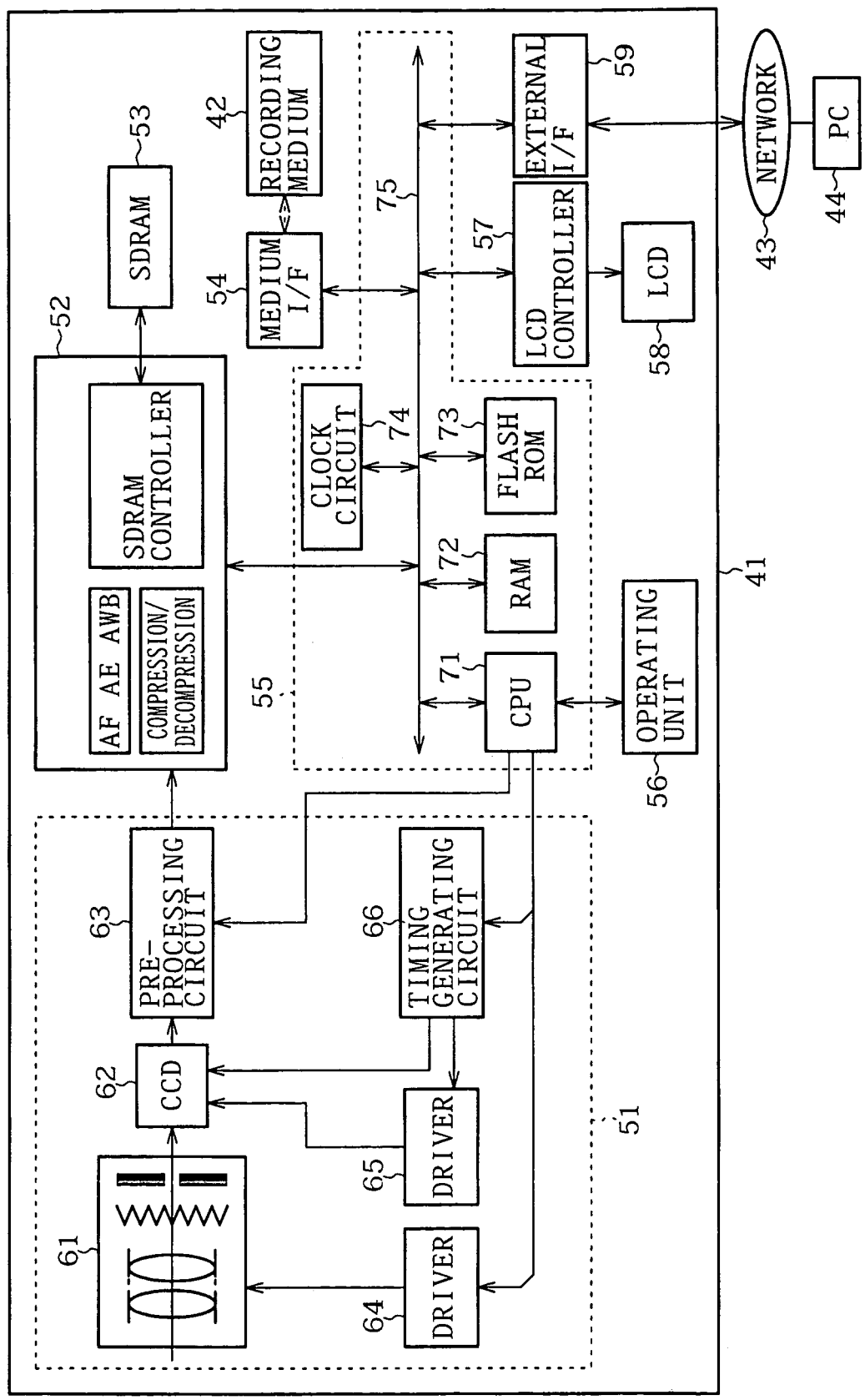
FIG. 4 is a block diagram showing an example of configuration of a picture taking apparatus according to the present invention.

The present invention provides an information processing apparatus (for example a picture taking apparatus 41 in FIG. 4) for making a list display of data recorded on a recording medium (for example a recording medium 42 in FIG. 4). The information processing apparatus includes: an obtaining unit (for example an image information obtaining unit 91 in FIG. 5) for obtaining picture taking date and time information of the data recorded on the recording medium; a range setting unit (for example an object range setting unit 93 in FIG. 5) for setting a data range in which display object data as objects for list display is obtained from within the data on a basis of the picture taking date and time information obtained by the obtaining unit; a picture taking interval calculating unit (for example a picture taking interval calculating unit 92 in FIG. 5) for obtaining a picture taking interval of each piece of data in the data range set by the range setting unit; a display object setting unit (for example a display object setting unit 94 in FIG. 5) for setting, as the display object data, pieces of data that have longest picture taking intervals obtained by the picture taking interval calculating unit among pieces of data in the data range set by the range setting unit and are not more than a number of images simultaneously displayable on the list display; and a data generating unit (for example a display data generating unit 95 in FIG. 5) for generating list display data including images of the display object data set by the display object setting unit.

The information processing apparatus further includes an image selecting unit (for example an operating unit 56 in FIG. 4) for selecting one image among the images being put on the list display on a basis of an operation by a user, wherein the range setting unit (for example the object range setting unit 93 in FIG. 5 that performs a process of step S12 in FIG. 8) can set a range from a piece of display object data corresponding to the one image selected by the image selecting unit to data preceding a next piece of display object data as a data range in which display object data as objects for a next list display is obtained.

The information processing apparatus further includes an image selecting unit (for example an operating unit 56 in FIG. 4) for selecting one image among the images being put on the list display on a basis of an operation by a user, wherein the range setting unit (for example the object range setting unit 93 in FIG. 5 that performs a process of step S62 in FIG. 14) can set a range from a piece of display object data preceding a piece of display object data corresponding to the one image selected by the image selecting unit to data preceding a piece of display object data following the piece of display object data corresponding to the one image as a data range in which display object data as objects for a next list display is obtained.

The information processing apparatus further includes a data number determining unit (for example the object range setting unit 93 in FIG. 5 that performs a process of step S5 in FIG. 7) for determining whether a number of the pieces of data in the data range set by the range setting unit is not larger than the number of images simultaneously displayable on the list display, wherein the display object setting unit sets all the pieces of data in the data range as the display object data when the data number determining unit determines that the number of the pieces of data in the data range is not larger than the number of images simultaneously displayable on the list display.

In the information processing apparatus, the display object setting unit can include: a calculation object setting unit (for example a calculation object setting unit 101 in FIG. 6) for setting picture taking intervals of calculation objects as objects for calculation of an average value of the picture taking intervals among the picture taking intervals obtained by the picture taking interval calculating unit; an average value calculating unit (for example an average value calculating unit 102 in FIG. 6) for calculating the average value of the picture taking intervals as the calculation objects set by the calculation object setting unit; a display candidate specifying unit (for example a display candidate specifying unit 103 in FIG. 6) for specifying, as display candidates, data of longer picture taking intervals than the average value calculated by the average value calculating unit, among the picture taking intervals obtained by the picture taking interval calculating unit; a display number determining unit (for example a display number determining unit 104 in FIG. 6) for determining whether a number of the display candidates specified by the display candidate specifying unit is not larger than the number of images simultaneously displayable on the list display; and an object data setting unit (for example a display data setting unit 105 in FIG. 6) for setting all the data specified as the display candidates as the display object data when the display number determining unit determines that the number of the display candidates is not larger than the number of images simultaneously displayable on the list display.

In the information processing apparatus, when the display number determining unit determines that the number of the display candidates is larger than the number of images simultaneously displayable on the list display, the calculation object setting unit (for example the calculation object setting unit 101 in FIG. 6 that performs a process of step S25 in FIG. 10) can set picture taking intervals of data not specified by the display candidate specifying unit as display candidates last time but specified as display candidates this time among the picture taking intervals obtained by the picture taking interval calculating unit as the picture taking intervals of the calculation objects.

In the information processing apparatus, the display object setting unit further includes an equal number determining unit (for example the display number determining unit 104 in FIG. 6 that performs a process of step S26 in FIG. 10) for determining whether the number of the display candidates is equal to the number of images simultaneously displayable on the list display when the display number determining unit determines that the number of the display candidates is not larger than the number of images simultaneously displayable on the list display, and when the equal number determining unit determines that the number of the display candidates is not equal to the number of images simultaneously displayable on the list display, the calculation object setting unit (for example the calculation object setting unit 101 in FIG. 6 that performs a process of step S25 in FIG. 10) can set picture taking intervals of data specified by the display candidate specifying unit as display candidates last time but not specified as display candidates this time among the picture taking intervals obtained by the picture taking interval calculating unit as the picture taking intervals of the calculation objects.

The information processing apparatus (for example the picture taking apparatus 41 in FIG. 4) can further include a display control unit (for example an LCD controller 57 in FIG. 4) for controlling display of the list display data generated by the data generating unit.

The information processing apparatus (for example a server 301 in FIG. 16) can further include a data transmitting unit (for example an external I/F 59 in FIG. 4) for transmitting the list display data generated by the data generating unit via a network (for example a network 303 in FIG. 16) in response to a request from another information processing apparatus (for example a PC 302 in FIG. 16) connected via the network.

The information processing apparatus can further include: a data input unit (for example an external I/F 59 in FIG. 4) for inputting data from another information processing apparatus (for example a PC 302 in FIG. 16) via a network (for example a network 303 in FIG. 16); and a recording unit (for example a medium I/F 54 in FIG. 4) for recording the data inputted by the data input unit onto a recording medium.

The present invention provides an information processing method for making a list display of data recorded on a recording medium. The information processing method includes: an obtaining step (for example step S2 in FIG. 7) of obtaining picture taking date and time information of the data recorded on the recording medium; a range setting step (for example step S4 in FIG. 7) of setting a data range in which display object data as objects for list display is obtained from within the data on a basis of the picture taking date and time information obtained by a process of the obtaining step; a picture taking interval calculating step (for example step S6 in FIG. 7) of obtaining a picture taking interval of each piece of data in the data range set by a process of the range setting step; a display object setting step (for example step S7 in FIG. 7) of setting, as the display object data, pieces of data that have longest picture taking intervals obtained by a process of the picture taking interval calculating step among pieces of data in the data range set by the process of the range setting step and are not more than a number of images simultaneously displayable on the list display; and a data generating step (for example step S9 in FIG. 7) of generating list display data including images of the display object data set by a process of the display object setting step.

The information processing method can further include a display control step (for example step S10 in FIG. 8) of controlling display of the list display data generated by a process of the data generating step.

The information processing method can further include a data transmitting step (for example a process step performed by an external I/F 59 in FIG. 4) of transmitting the list display data generated by a process of the data generating step via a network in response to a request from another information processing apparatus connected via the network.

The information processing method can further include: a data input step (for example a process step performed by an external I/F 59 in FIG. 4) of inputting data from another information processing apparatus via a network; and a recording step (for example a process step performed by a medium I/F 54 in FIG. 4) of recording the data inputted by a process of the data input step onto a recording medium.

The present invention provides a picture taking apparatus for making a list display of images of image data recorded on a recording medium (for example a recording medium 42 in FIG. 4), the picture taking apparatus including: a picture taking unit (for example a camera unit 51 in FIG. 4) for photographing a subject; and a recording unit (for example a signal processing unit 52 in FIG. 4) for recording image data of the subject photographed by the picture taking unit onto a recording medium. The picture taking apparatus includes: an obtaining unit (for example an image information obtaining unit 91 in FIG. 5) for obtaining picture taking date and time information of the data recorded on the recording medium; a range setting unit (for example an object range setting unit 93 in FIG. 5) for setting a data range in which display object data as objects for list display is obtained from within the data on a basis of the picture taking date and time information obtained by the obtaining unit; a picture taking interval calculating unit (for example a picture taking interval calculating unit 92 in FIG. 5) for obtaining a picture taking interval of each piece of data in the data range set by the range setting unit; a display object setting unit (for example a display object setting unit 94 in FIG. 5) for setting, as the display object data, pieces of data that have longest picture taking intervals obtained by the picture taking interval calculating unit among pieces of data in the data range set by the range setting unit and are not more than a number of images simultaneously displayable on the list display; a data generating unit (for example a display data generating unit 95 in FIG. 5) for generating list display data including images of the display object data set by the display object setting unit; and a display control unit (for example an LCD controller 57 in FIG. 4) for controlling display of the list display data generated by the data generating unit.

Incidentally, a program recording medium and a program according to the present invention are basically included in the same manner as the above-described information processing method according to the present invention, and therefore repeated description thereof will be omitted.

An embodiment of the present invention will hereinafter be described with reference to the drawings.

FIG. 4 shows an example of configuration of a picture taking apparatus 41 to which the present invention is applied. In the case of FIG. 4, on the basis of an operation of an operating unit 56 by a user, the picture taking apparatus 41 records data taken by a camera unit 51 onto a recording medium 42 mounted in the picture taking apparatus 41, and displays the data recorded on the recording medium 42 on an LCD (Liquid Crystal Display) 58 or the like. The recording medium 42 is formed by a memory card, an optical disk, a hard disk, or a DVD, for example. Further, the picture taking apparatus 41 is connected to a PC (Personal Computer) 44 via a network 43 typified by the Internet to display data recorded on the PC 44 on the LCD 58 or the like, or obtain the data and record the data onto the recording medium 42.

In the case of FIG. 4, the picture taking apparatus 41 is broadly divided into the camera unit 51, a signal processing unit 52, an SDRAM (Synchronous Dynamic Random Access Memory) 53, a medium interface (hereinafter referred to as a medium I/F) 54, a control unit 55, the operating unit 56, an LCD controller 57, the LCD 58, and an external interface (hereinafter referred to as an external I/F) 59. The recording medium 42 is removable from the medium I/F 54. Incidentally, while as with image data, audio data is in practice input to the picture taking apparatus 41 in FIG. 4 to be subjected to predetermined signal processing, recorded onto the recording medium 42, and output as sound from a speaker or the like not shown in the figure, description and illustration thereof is omitted.

The camera unit 51 includes: an optical block 61 including a lens, a focus mechanism, a shutter mechanism, and a diaphragm (iris) mechanism and the like; a CCD (Charge Coupled Device) image pickup device 62 (hereinafter referred to simply as a CCD 62); a pre-processing circuit 63; a driver 64 for the optical block; a driver 65 for the CCD; and a timing generating circuit 66.

The control unit 55 is a microcomputer formed by connecting a CPU (Central Processing Unit) 71, a RAM (Random Access Memory) 72, a flash ROM (Read Only Memory) 73, and a clock circuit 74 to each other via a system bus 75. The control unit 55 controls each part of the picture taking apparatus 41. The RAM 72 is mainly used as a work area for temporarily storing a result of processing in progress, for example. The flash ROM 73 stores various programs executed by the CPU 71, data required for processing, and the like. The clock circuit 74 can supply information of a present date, a present day of the week, and a present time, and also supplies picture taking date and time information or the like to the CPU 71 and the like.

At a time of picture taking, the optical block driver 64 forms a driving signal for operating the optical block 61 under control of the control unit 55, and supplies the driving signal to the optical block 61 to operate the optical block 61. In response to the driving signal from the optical block driver 64, the optical block 61 controls the focus mechanism, the shutter mechanism, and the diaphragm mechanism to capture an image of a subject and then supply the image to the CCD 62.

The CCD 62 subjects the image from the optical block 61 to photoelectric conversion, and then outputs the result. Specifically, the CCD 62 operates in response to a driving signal from the CCD driver 65 to capture the image of the subject from the optical block 61 and supply the captured image (image information) of the subject as an electric signal to the pre-processing circuit 63 on the basis of a timing signal from the timing generating circuit 66 controlled by the control unit 55. The timing generating circuit 66 forms the timing signal for providing predetermined timing under control of the control unit 55. The CCD driver 65 forms the driving signal to be supplied to the CCD 62 on the basis of a timing signal from the timing generating circuit 66.

The pre-processing circuit 63 subjects the image information as the electric signal supplied thereto to CDS (Correlated Double Sampling) processing to maintain a good S/N ratio, subjects the image information as the electric signal to AGC (Automatic Gain Control) processing to control gain, and subjects the image information as the electric signal to A/D (Analog/Digital) conversion to form image data as a digital signal.

The image data as the digital signal from the pre-processing circuit 63 is supplied to the signal processing unit 52. The signal processing unit 52 subjects the image data supplied thereto to AF (Auto Focus), AE (Auto Exposure), AWB (Auto White Balance), and other camera signal processing. The image data subjected to the camera signal processing is compressed by a predetermined compression system, and then supplied to the recording medium 42 mounted in the picture taking apparatus 41 via the system bus 75 and the medium I/F 54. Picture taking date and time information and the like of the image data are supplied by the CPU 71 to the recording medium 42 mounted in the picture taking apparatus 41 via the system bus 75 and the medium I/F 54. Then, the image data is recorded onto the recording medium 42 together with the picture taking date and time information and the like.

In response to an operation input from a user which input is received via the operating unit 56 including a touch panel, control keys or the like, the CPU 71 selects image data to be displayed, reads the selected image data from the recording medium 42 via the medium I/F 54, and then supplies the image data to the signal processing unit 52.

The signal processing unit 52 subjects the compressed image data read from the recording medium 42 and then supplied to the signal processing unit 52 via the medium I/F 54 to data decompression processing (expansion processing), and then supplies the decompressed image data to the LCD controller 57 via the system bus 75. The LCD controller 57 forms an image signal to be supplied to the LCD 58 from the supplied image data, and then supplies the formed image signal to the LCD 58. Thereby an image corresponding to the image data recorded on the recording medium 42 is displayed on a display screen of the LCD 58.

The picture taking apparatus 41 can make a simultaneous list display of thumbnail images of nine pieces of image data, for example, among pieces of image data recorded on the recording medium 42. Specifically, in this case, in response to an operation input from a user which input is received via the operating unit 56 including the touch panel, the control keys or the like, picture taking date and time information of the image data is read from the recording medium 42 via the medium I/F 54, and then supplied to the RAM 72. The CPU 71 obtains picture taking intervals of the image data in an object range (for example all the image data recorded on the recording medium 42) on the basis of the picture taking date and time information supplied to the RAM 72. The CPU 71 sets, as display object data, pieces of data that have longest picture taking intervals among the pieces of image data in the object range and are equal in number to a number (for example nine) of images simultaneously displayable at the time of the list display. The CPU 71 reads thumbnail image data of the set display object data in order of picture taking date and time via the medium I/F 54, and then supplies the thumbnail image data to the signal processing unit 52.

The signal processing unit 52 subjects the compressed thumbnail image data read from the recording medium 42 and then supplied thereto via the medium I/F 54 to data decompression processing (expansion processing), generates list display data of thumbnail images using the decompressed thumbnail image data, and then supplies the generated list display data to the LCD controller 57 via the system bus 75. On the basis of the supplied list display data, the LCD controller 57 forms an image signal for the list display of the thumbnail images to be supplied to the LCD 58, and then supplies the formed image signal to the LCD 58. Thereby the thumbnail images of the image data recorded on the recording medium 42 are listed in order of picture taking date and time on the display screen of the LCD 58.

The picture taking apparatus 41 is also provided with the external I/F 59. The external I/F 59 is connected to the network 43 such the Internet, an intranet or the like to obtain various image data or other information recorded on the PC 44 connected to the network 43 and record the various image data or other information onto the recording medium 42, or transmit information such as image data or the like recorded on the recording medium 42 mounted in the picture taking apparatus 41 to the PC 44 via the network 43. Incidentally, the external I/F 59 may be directly connected with another apparatus.

Further, as for image data recorded on a hard disk or the like not shown of the PC 44, the picture taking apparatus 41 can also read and reproduce the image data via the external I/F 59 and the network 43 to display the image data on the LCD 58 as described above, or set display object data and make simultaneous list display of thumbnail images of the set display object data on the LCD 58 as described above. Incidentally, the external I/F 59 may include an IEEE (Institute of Electrical and Electronics Engineers) 1394, a USB (Universal Serial Bus) or another wired interface, or may include a wireless interface using light or radio waves. That is, the network 43 may be either of a wire network and a wireless network, and the external I/F 59 may be either of a wired interface and a wireless interface.

As described above, the picture taking apparatus 41 obtains picture taking intervals of image data set as an object range among pieces of image data recorded on the recording medium (for example the recording medium 42 or the PC 44 connected to the network 43). The picture taking apparatus 41 sets, as display object data, pieces of data that have longest picture taking intervals among the pieces of image data in the object range and are equal in number to a number (for example nine) of images simultaneously displayable at the time of list display. The picture taking apparatus 41 makes a list display of thumbnail images of the set display object data in order of picture taking date and time. Thus, seeing the list display, the user can find, read, reproduce, and use desired image data among the pieces of image data recorded on the recording medium.

Incidentally, while the recording medium 42 on which the data is recorded is described as removable in FIG. 4, the recording medium 42 may be a built-in recording medium.

Figure 5:
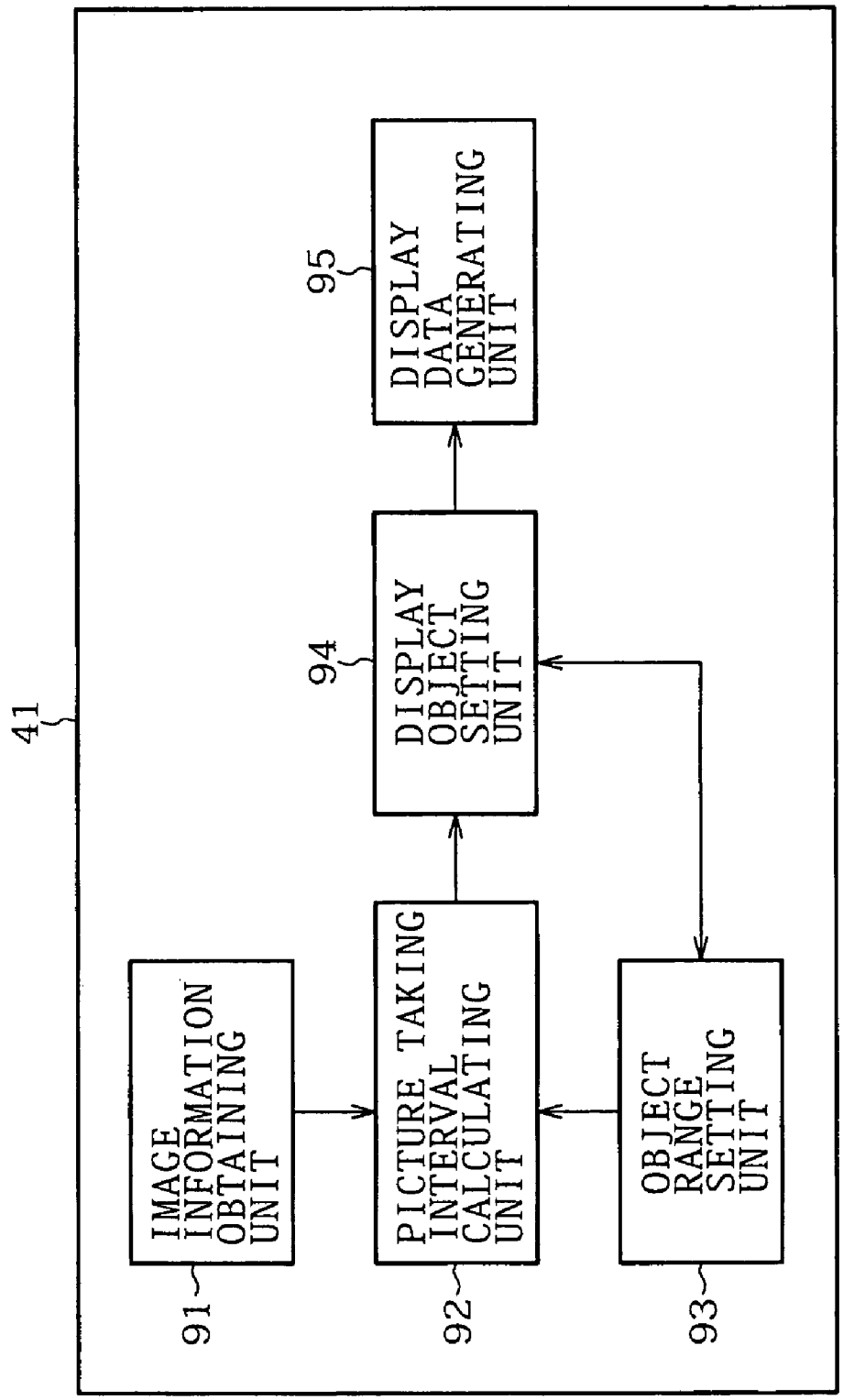
FIG. 5 is a functional block diagram showing an example of functional configuration of the picture taking apparatus in FIG. 4.

FIG. 5 is a block diagram showing an example of functional configuration of the picture taking apparatus 41. Functional blocks shown in FIG. 5 are implemented by the CPU 71 of the picture taking apparatus 41 executing a predetermined control program.

In response to an operation input supplied from a user via the operating unit 56 to give an instruction for list display of image data recorded on the recording medium 42, an image information obtaining unit 91 reads picture taking date and time information or the like of the image data recorded on the recording medium 42 from the recording medium 42 via the medium I/F 54, sorts the picture taking date and time information in order of picture taking date and time, and then supplies the sorted picture taking date and time information to a picture taking interval calculating unit 92.

The picture taking interval calculating unit 92 calculates a picture taking interval of each piece of image data (with reference to a preceding piece of image data) in an object range set by an object range setting unit 93 on the basis of the picture taking date and time information sorted by the image information obtaining unit 91. The picture taking interval calculating unit 92 supplies the calculated picture taking interval of the image data to a display object setting unit 94.

The object range setting unit 93 sets an object range of image data as objects to be displayed in list display in response to an operation input supplied by the user via the operating unit 56. The object range setting unit 93 then supplies information of the set object range to the picture taking interval calculating unit 92. When list display is not made on the LCD 58 and an instruction for list display is given, all the image data recorded on the recording medium 42 is set as an object range. Further, setting the object range, the object range setting unit 93 determines whether a number of pieces of data in the object range is not larger than a number of images simultaneously displayable in list display on the basis of display object data information set by the display object setting unit 94. When the number of pieces of data in the object range is not larger than the number of images simultaneously displayable in list display, the object range setting unit 93 controls the display object setting unit 94 to set the image data in the object range as display object data.

The display object setting unit 94 sets, as display object data, data of not more than a number of (for example nine) images simultaneously displayable in list display among the pieces of image data in the object range. The display object setting unit 94 then outputs information of the display object data to the object range setting unit 93 and a display data generating unit 95. Specifically, receiving the picture taking intervals of the image data which intervals are calculated by the picture taking interval calculating unit 92, the display object setting unit 94 sets, as display object data, pieces of data that have longest picture taking intervals among the pieces of image data in the object range and are equal in number to a number (for example nine) of images simultaneously displayable in list display. The display object setting unit 94 outputs the information of the display object data to the object range setting unit 93 and the display data generating unit 95. Further, under control of the object range setting unit 93, the display object setting unit 94 sets the image data in the object range as display object data, and then outputs the information of the display object data to the display data generating unit 95.

The display data generating unit 95 reads thumbnail image data corresponding to the display object data set by the display object setting unit 94 from the recording medium 42, generates list display data including these thumbnail images in order of picture taking date and time, and then supplies the generated list display data to the LCD controller 57.

Figure 6:
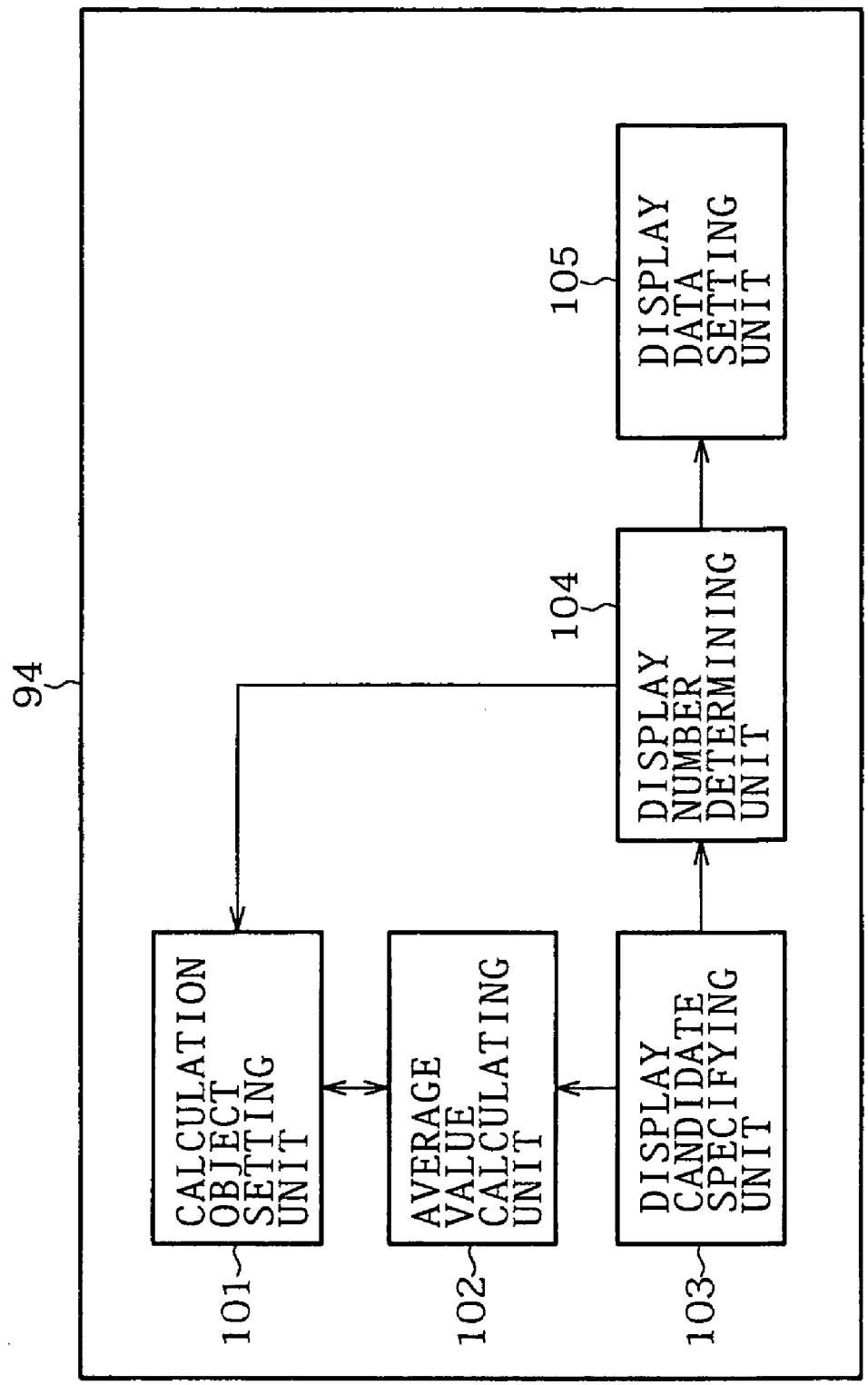
FIG. 6 is a block diagram showing a detailed configuration of a display object setting unit in FIG. 5.

FIG. 6 shows a detailed functional configuration of the display object setting unit 94. In the example of FIG. 6, the display object setting unit 94 includes a calculation object setting unit 101, an average value calculating unit 102, a display candidate specifying unit 103, a display number determining unit 104, and a display data setting unit 105.

The calculation object setting unit 101 determines which image data picture taking intervals among the image data picture taking intervals calculated by the picture taking interval calculating unit 92 are to be set as objects for average value calculation performed by the average value calculating unit 102 on the basis of a result of determination of the display number determining unit 104. The calculation object setting unit 101 supplies information on the set calculation objects to the average value calculating unit 102. Incidentally, for a first time, all the image data picture taking intervals calculated by the picture taking interval calculating unit 92 are set as calculation objects.

The average value calculating unit 102 calculates an average value of the picture taking intervals of the calculation objects on the basis of the information on the calculation objects set by the calculation object setting unit 101. The average value calculating unit 102 then supplies the calculated average value of the picture taking intervals as a reference value of the picture taking intervals to the display candidate specifying unit 103.

The display candidate specifying unit 103 compares the picture taking interval of each piece of image data with the reference value of the picture taking intervals from the average value calculating unit 102, specifies image data of a longer picture taking interval than the reference value of the picture taking intervals as a display candidate, and then supplies information of the specified display candidate to the display number determining unit 104.

The display number determining unit 104 compares a number of display candidates specified by the display candidate specifying unit 103 with a number of images simultaneously displayable at the time of list display. The display number determining unit 104 thereby determines whether the number of display candidates is not larger than the number of displayable images and whether the number of display candidates is equal to the number of displayable images, for example. On the basis of a result of the determination, the display number determining unit 104 controls the calculation object setting unit 101 and the display data setting unit 105. Specifically, when the display number determining unit 104 determines that the number of display candidates is equal to the number of displayable images, the display number determining unit 104 controls the display data setting unit 105 to set the image data of the display candidates as display object data. When the display number determining unit 104 determines that the number of display candidates is larger than the number of displayable images, the display number determining unit 104 controls the calculation object setting unit 101 to set picture taking intervals of image data not specified by the display candidate specifying unit 103 as display candidates last time but specified as display candidates this time as calculation objects. When the display number determining unit 104 determines that the number of display candidates is smaller than the number of displayable images, the display number determining unit 104 controls the calculation object setting unit 101 to set picture taking intervals of image data specified by the display candidate specifying unit 103 as display candidates last time but not specified as display candidates this time as calculation objects.

The display data setting unit 105 sets the image data specified as display candidates by the display candidate specifying unit 103 as display object data under control of the display number determining unit 104. The display data setting unit 105 then supplies information of the set display object data to the object range setting unit 93 and the display data generating unit 95. Further, the display data setting unit 105 sets the image data in the object range as display object data under control of the object range setting unit 93, and then outputs information of the display object data to the display data generating unit 95.

Figure 7:
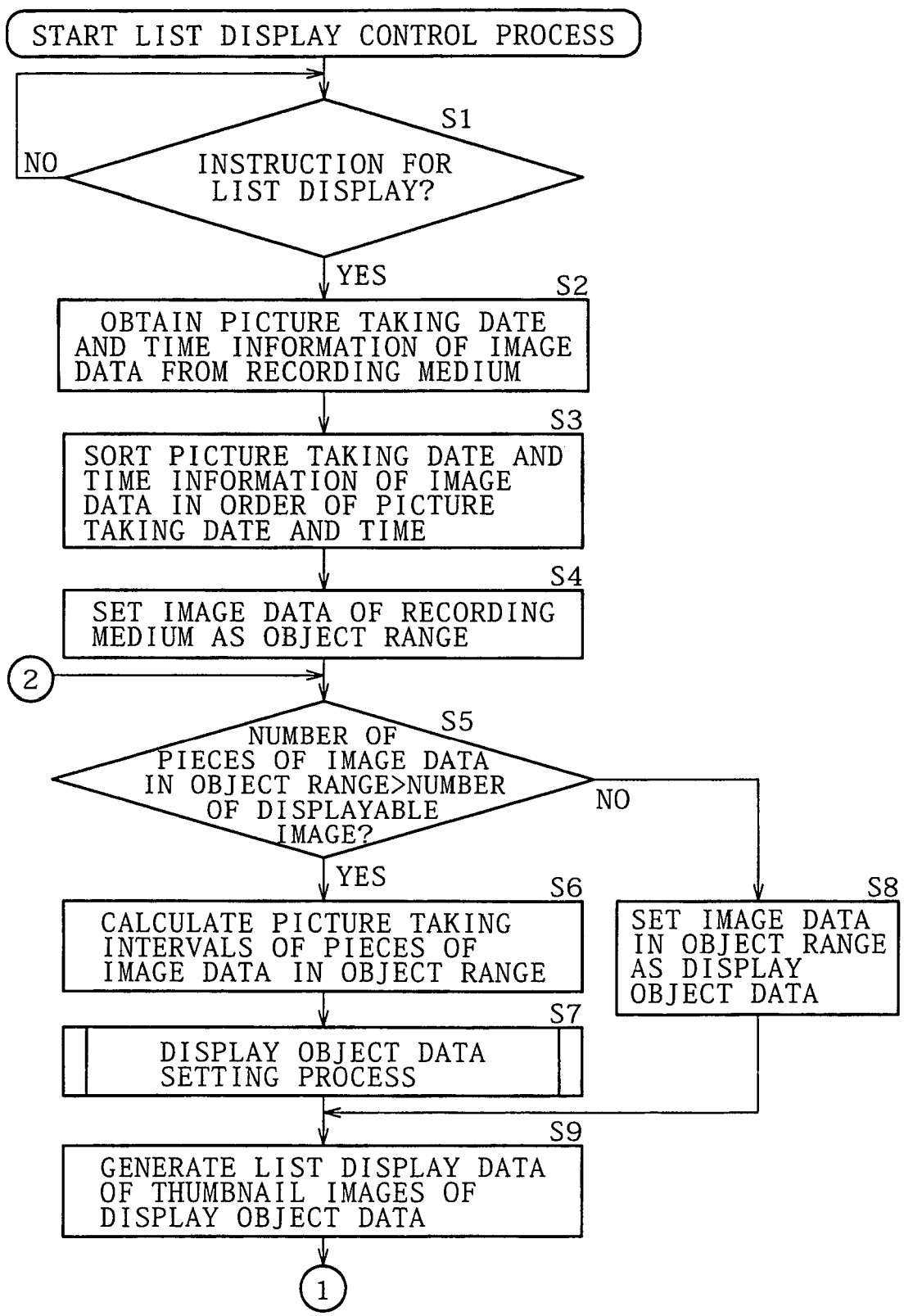
FIG. 7 is a flowchart of assistance in explaining an example of a list display control process of the picture taking apparatus in FIG. 4.
Figure 8:
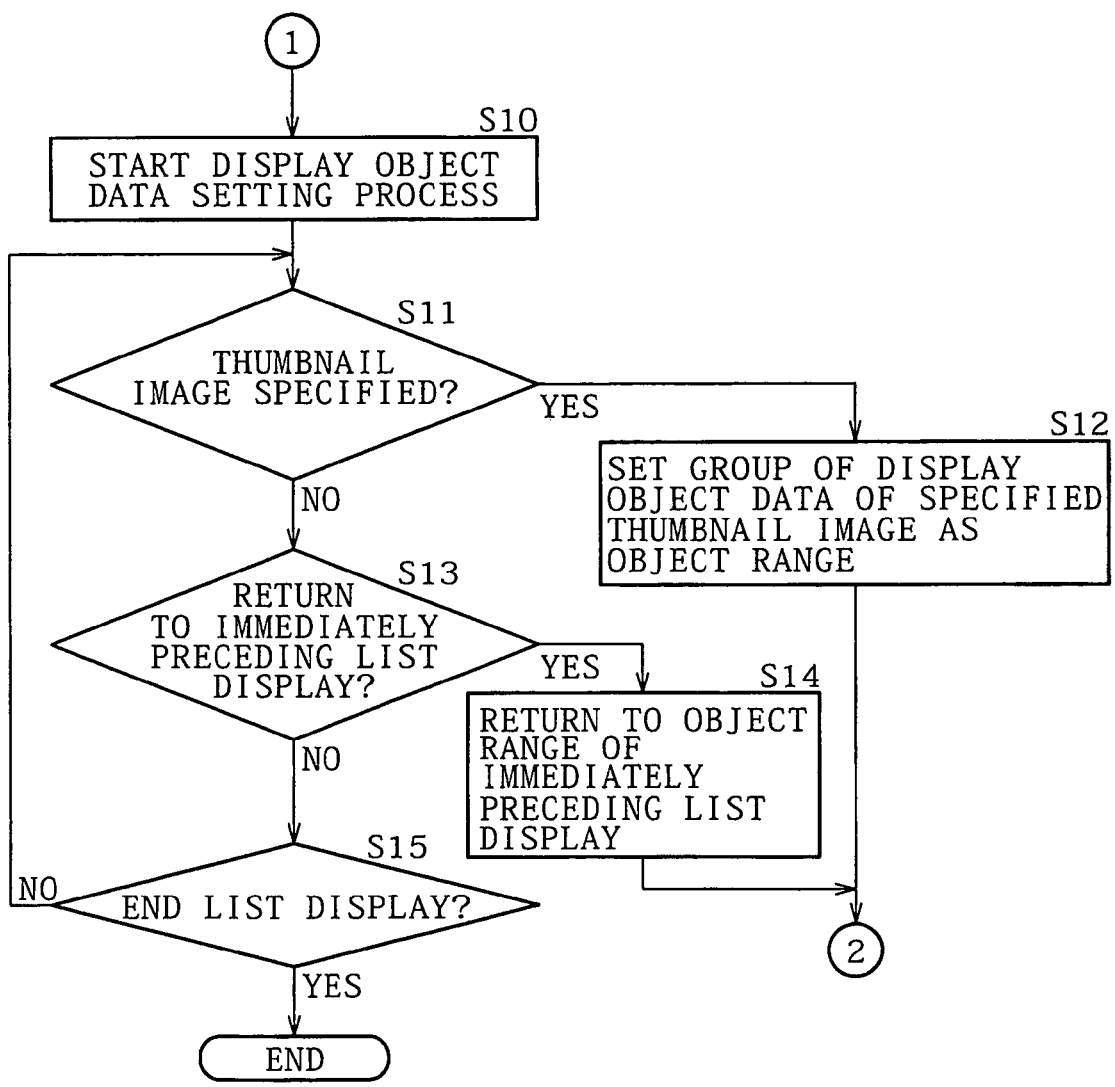
FIG. 8 is a flowchart of assistance in explaining the example of the list display control process of the picture taking apparatus in FIG. 4.

A list display control process of the picture taking apparatus 41 will next be described with reference to flowcharts of FIG. 7 and FIG. 8.

To search the image data recorded on the recording medium 42 for desired image data, the user operates the operating unit 56 including the touch panel, the control keys or the like of the picture taking apparatus 41 to give an instruction for list display. In response to this, the operating unit 56 supplies the instruction for list display to the image information obtaining unit 91. The image information obtaining unit 91 stands by in step S1 until an instruction for list display of image data recorded on the recording medium 42 is given. The image information obtaining unit 91 determines that an instruction for list display of image data recorded on the recording medium 42 is given on the basis of the instruction supplied from the operating unit 56. The process proceeds to step S2, where the image information obtaining unit 91 reads picture taking date and time information or the like of the image data recorded on the recording medium 42 from the recording medium 42 via the medium I/F 54. The process proceeds to step S3, where the image information obtaining unit 91 sorts the read picture taking date and time information in order of picture taking date and time, and then supplies the sorted picture taking date and time information to the picture taking interval calculating unit 92. The process proceeds to step S4.

In step S4, the object range setting unit 93 sets all the image data recorded on the recording medium 42 as a list display object range. The process proceeds to step S5, where the object range setting unit 93 determines whether a number of pieces of image data in the set object range is larger than a number of (for example nine) images displayable in list display. When the object range setting unit 93 determines that the number of pieces of image data in the set object range is larger than the number of images displayable in list display, the object range setting unit 93 supplies information of the set object range to the picture taking interval calculating unit 92. The process proceeds to step S6. In step S6, the picture taking interval calculating unit 92 calculates a picture taking interval of each piece of image data in the object range set by the object range setting unit 93 on the basis of the picture taking date and time information sorted by the image information obtaining unit 91. The picture taking interval calculating unit 92 supplies the calculated picture taking interval of the piece of image data to the display object setting unit 94. The process proceeds to step S7.

After the picture taking interval calculating unit 92 calculates the picture taking intervals of the image data, the display object setting unit 94 performs a display object data setting process in step S7. The process proceeds to step S9. Though the display object data setting process will be described later in detail with reference to a flowchart of FIG. 10, the display object setting unit 94 in step S7 sets, as display object data, pieces of image data that have longest picture taking intervals among the pieces of image data in the object range and are not more than the number of images simultaneously displayable in list display, and then outputs information of the set display object data to the display data generating unit 95. At this time, pieces of image data equal in number to the number (nine) of images simultaneously displayable in list display, for example, are set as the display object data. Incidentally, in practice, since a picture taking interval of a first piece of image data in the object range with reference to a preceding piece of image data cannot be obtained, the first piece of image data in the object range is set as display object data in advance. Thus, in this case, eight pieces of image data other than the first piece of image data in the object range are set as display object data.

On the other hand, when the object range setting unit 93 determines in step S5 that the number of pieces of image data in the set object range is not larger than the number of images displayable in list display, the object range setting unit 93 supplies information of the set object range to the display data setting unit 105. The process proceeds to step S8. The display data setting unit 105 sets the image data in the object range as display object data under control of the object range setting unit 93, and then outputs information of the display object data to the display data generating unit 95. The process proceeds to step S9. That is, in this case, since thumbnail images of the image data in the set object range are simultaneously displayed in list display, the display object data setting process in step S7 is not required. Incidentally, in this case, when the pieces of display object data are less than the number of images displayable in list display, only thumbnail images corresponding to the pieces of display object data may be displayed, or display object data may be set from image data following the object range to display thumbnail images equal in number to the number of images displayable in list display.

In step S9, the display data generating unit 95 reads thumbnail image data corresponding to the display object data set by the display object setting unit 94 from the recording medium 42, generates list display data including the thumbnail images arranged in order of picture taking date and time, and then supplies the generated list display data to the LCD controller 57. The process proceeds to step S10 in FIG. 8. In step S10, the LCD controller 57 makes a list display on the LCD 58 on the basis of the list display data from the display data generating unit 95. The process proceeds to step S11.

As described above, in list display on the LCD 58, thumbnail images of nine pieces of display object data (nine pieces of image data having longest picture taking intervals among pieces of image data in an object range) at the most are displayed in such a manner as to be arranged in order of picture taking date and time. In a case where nine thumbnail images are displayed, for example, in the list display, when there is at least one piece of image data taken between a date and time of display object data of a first thumbnail image and a date and time of display object data of a second thumbnail image within the object range, the first thumbnail image can be selected and specified.

Similarly, when there is at least one piece of image data taken between the date and time of the display object data of the second thumbnail image and a date and time of display object data of a third thumbnail image within the object range, the second thumbnail image can be selected and specified. That is, when there is at least one piece of image data taken between a date and time of display object data of an arbitrary thumbnail image and a date and time of display object data of a next thumbnail image within the object range, the arbitrary thumbnail image can be selected and specified. Incidentally, in a case of a last (for example a ninth) thumbnail image displayed in the list display, when there is at least one piece of image data taken after a date and time of display object data of the thumbnail image within the object range (that is, when display object data of the last thumbnail image displayed in the list display is not the newest of the pieces of data recorded on the recording medium 42 in terms of a picture taking date and time), the thumbnail image can be selected and specified.

Thus, viewing the list display of the thumbnail images displayed on the LCD 58, the user operates the operating unit 56 including the touch panel, the control keys or the like to specify one thumbnail image in the list display, give an instruction to return to an immediately preceding list display, or give an instruction to end the list display. In response to this, the operating unit 56 supplies instruction information from the user to the object range setting unit 93. In step S11, the object range setting unit 93 determines whether a thumbnail image is specified on the basis of the information supplied from the operating unit 56. When the object range setting unit 93 determines that a thumbnail image is specified, the process proceeds to step S12, where the object range setting unit 93 sets, as an object range, pieces of image data from display object data of the thumbnail image specified by the user to a piece of image data preceding display object data of a next thumbnail image (these pieces of image data will hereinafter be referred to as an image group). The process returns to step S5 in FIG. 7 to repeat a subsequent process from step S5 on down. That is, the subsequent process from step S5 on down deals with only the image data in the object range set in step S12 in FIG. 8 to set display object data.

When the object range setting unit 93 determines in step S11 that no thumbnail image is specified, the process proceeds to step S13, where the object range setting unit 93 determines whether a return to an immediately preceding list display is to be made on the basis of the information supplied from the operating unit 56. When the object range setting unit 93 determines that a return to the immediately preceding list display is to be made, the object range setting unit 93 returns a setting to an object range of the immediately preceding list display in step S14. The process returns to step S5 in FIG. 7 to repeat a subsequent process from step S5 on down. That is, the subsequent process from step S5 on down deals with only image data in the object range set in step S14 in FIG. 8 to set display object data.

Further, when the object range setting unit 93 determines in step S13 that no thumbnail image is specified, the process proceeds to step S15, where the object range setting unit 93 determines whether the list display is to be ended on the basis of the information supplied from the operating unit 56. When the object range setting unit 93 determines that the list display is to be ended, the list display control process is ended. When the object range setting unit 93 determines that the list display is not to be ended, the process returns to step S11 to repeat a subsequent process from step S11 on down.

As described above, pieces of image data that have longest picture taking intervals among pieces of image data in an object range on the recording medium 42 and are equal in number to the number (for example nine) of images simultaneously displayable at the time of list display are set as display object data. Thumbnail images of the set display object data are displayed in a list in order of picture taking date and time.

An example of a list display as described above will be described with reference to FIG. 9. The picture taking apparatus 41 makes a list display of thumbnail images of image data recorded on the recording medium 42 so as to arrange a maximum of nine thumbnail images in three rows and three columns, for example.

Figure 9:
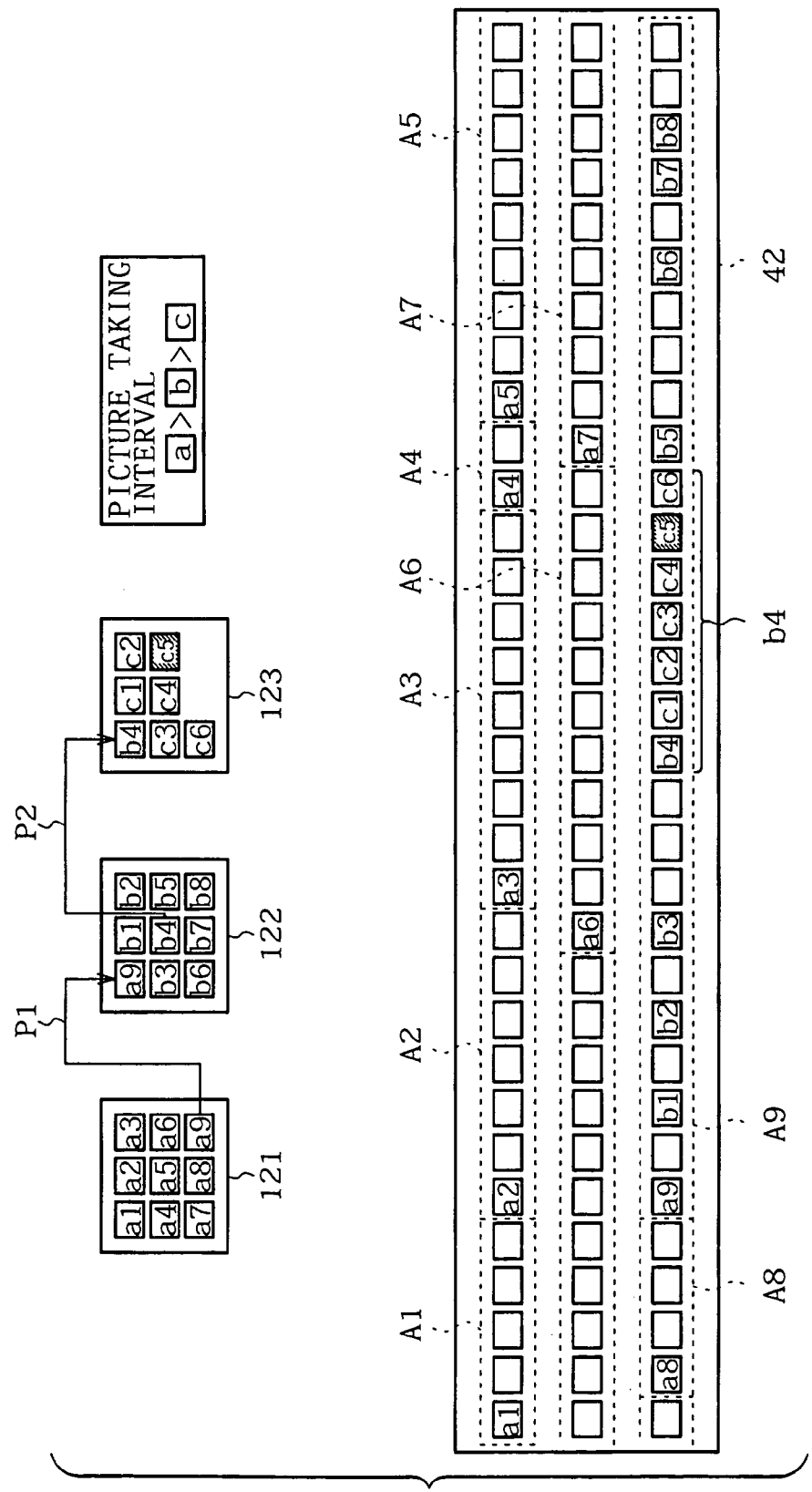
FIG. 9 is a diagram of assistance in explaining the list display control process of FIG. 7 and FIG. 8.

In the example of FIG. 9, three list display examples 121 to 123 are shown. In the list display 121, nine thumbnail images a1 to a9 of pieces of display object data a1 to a9 (the pieces of display object data a1 to a9 will hereinafter be referred to collectively as display object data a) of image data recorded on the recording medium 42 are displayed. In the list display 122, nine thumbnail images a9 and b1 to b8 of the display object data a1 and pieces of display object data b1 to b8 (the pieces of display object data b1 to b8 will hereinafter be referred to collectively as display object data b) of the image data recorded on the recording medium 42 are displayed. In the list display 123, seven thumbnail images b4 and c1 to c6 of the display object data b4 and pieces of display object data c1 to c6 (the pieces of display object data c1 to c6 will hereinafter be referred to collectively as display object data c) of the image data recorded on the recording medium 42 are displayed. Incidentally, as for length of picture taking intervals, an upper right portion of the figure shows that the picture taking interval of the display object data a> the picture taking interval of the display object data b> the picture taking interval of the display object data c.

Figure 1:
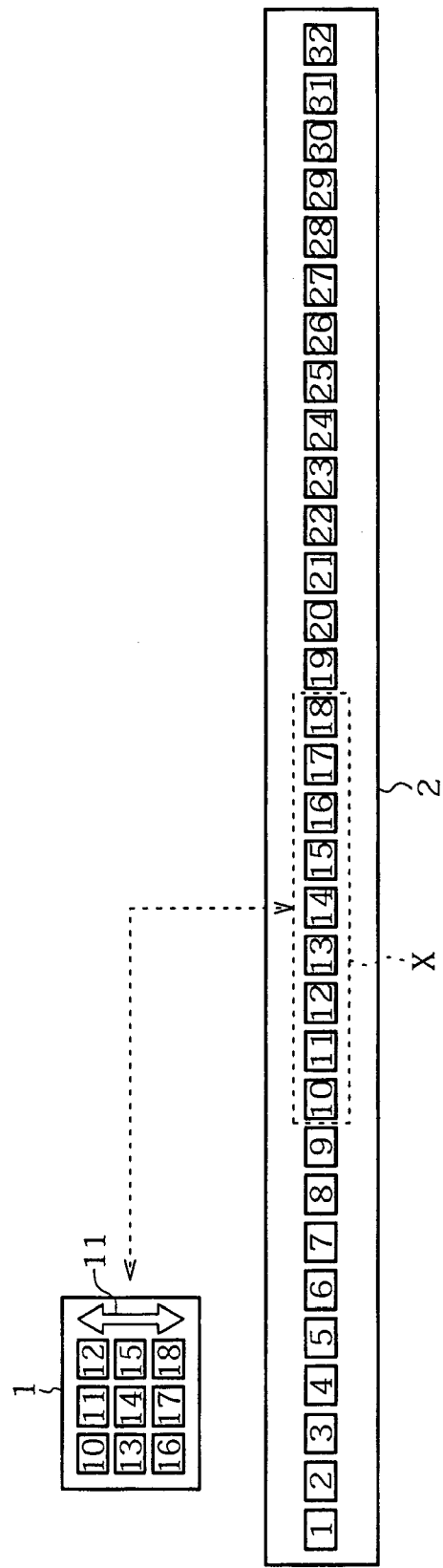
FIG. 1 is a diagram showing a conventional example of list display.
Figure 2:
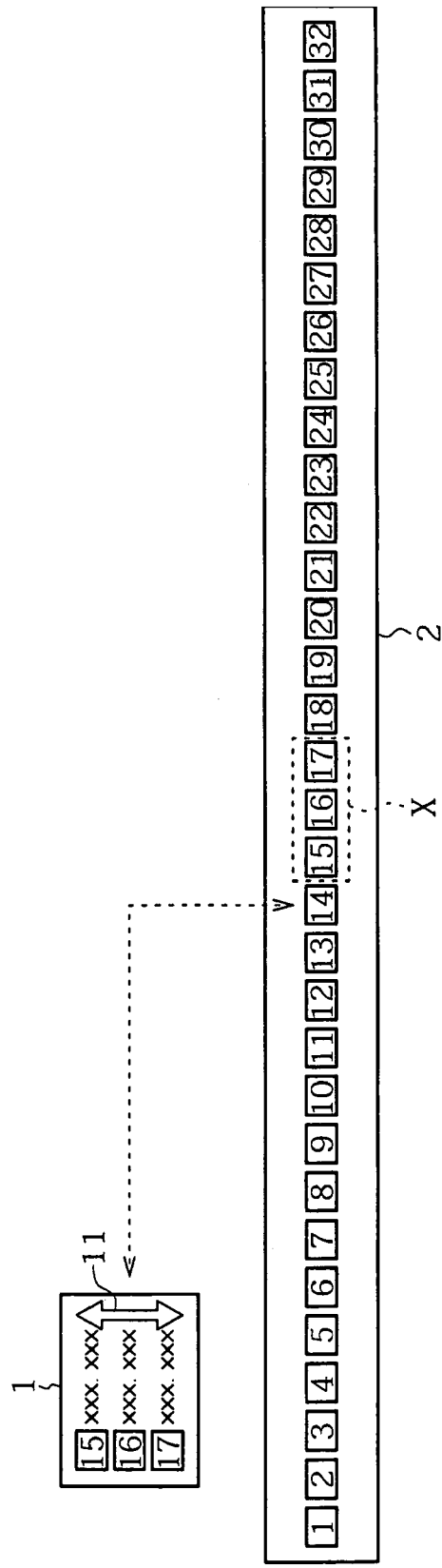
FIG. 2 is a diagram showing another conventional example of list display.
Figure 3:
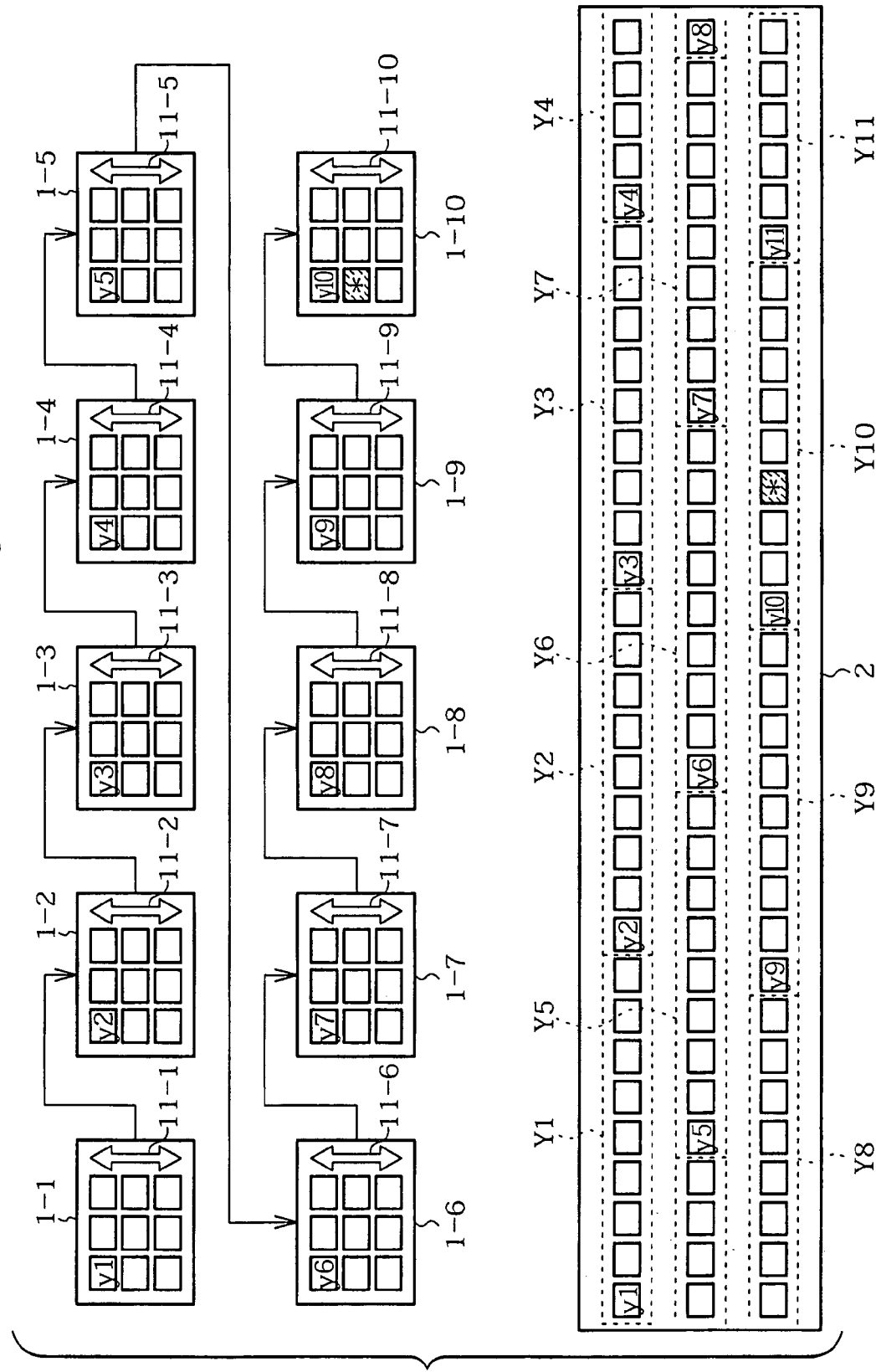
FIG. 3 is a diagram of assistance in explaining a conventional list display operation.

A lower part of the figure showing the list displays 121 to 123 shows the recording medium 42, on which 96 pieces of image data are recorded in order of picture taking date and time. As in the example of FIG. 3, suppose that a user is searching for the 85th piece of image data c5 (a hatched part in FIG. 9) from a start of the 96 pieces of image data recorded on the recording medium 42.

First, as described above with reference to FIG. 7 and FIG. 8, a first list display control process sets all the 96 pieces of image data recorded on the recording medium 42 as an object range, and sets, as the display object data a, pieces of image data that have longest picture taking intervals among the pieces of image data set as the object range and are equal in number to the number (nine) of images simultaneously displayable at the time of list display. In the example of FIG. 9, the first piece of image data a1 from the start of the recording medium 42, the sixth piece of image data a2 from the start, the 13th piece of image data a3 from the start, the 22nd piece of image data a4 from the start, the 24th piece of image data a5 from the start, the 44th piece of image data a6 from the start, the 55th piece of image data a7 from the start, the 63rd piece of image data a8 from the start, and the 70th piece of image data a9 from the start have long picture taking intervals within the object range, and are thus set as the display object data a. Therefore the thumbnail images a1 to a9 corresponding to the pieces of display object data (image data) a1 to a9 are displayed in order of picture taking date and time in the list display 121. Incidentally, in the example of FIG. 9, the picture taking interval of the first piece of image data from the start cannot be obtained in the object range because the first piece of image data is situated at the start, and therefore the first piece of image data is preset as display object data.

When there is image data between the display object data a1 and the display object data a2 on the recording medium 42 (that is, when there is image data taken between picture taking dates and times of the display object data a1 and the display object data a2), the thumbnail image a1 can be specified in the list display 121. When the thumbnail image a1 is specified by the user, a range A1 from the display object data a1 to image data preceding the display object data a2 becomes an object range for the next display object data setting process. Similarly, when the thumbnail image a2 is specified by the user, a range A2 from the display object data a2 to image data preceding the display object data a3 becomes an object range for the next display object data setting process. When the thumbnail image a3 is specified by the user, a range A3 from the display object data a3 to image data preceding the display object data a4 becomes an object range for the next display object data setting process. When the thumbnail image a4 is specified by the user, a range A4 from the display object data a4 to image data preceding the display object data a5 becomes an object range for the next display object data setting process.

Further, similarly, when the thumbnail image a5 is specified by the user, a range A5 from the display object data a5 to image data preceding the display object data a6 becomes an object range for the next display object data setting process. When the thumbnail image a6 is specified by the user, a range A6 from the display object data a6 to image data preceding the display object data a7 becomes an object range for the next display object data setting process. When the thumbnail image a7 is specified by the user, a range A7 from the display object data a7 to image data preceding the display object data a8 becomes an object range for the next display object data setting process. When the thumbnail image a8 is specified by the user, a range A8 from the display object data a8 to image data preceding the display object data a9 becomes an object range for the next display object data setting process. When the thumbnail image a9 is specified by the user, a range A9 from the display object data a9 to last image data (newest data in terms of the picture taking date and time) on the recording medium 42 becomes an object range for the next display object data setting process.

Image data included in each of the ranges A1 to A9 has shorter picture taking intervals with reference to preceding image data than at least the image data set as the display object data a. That is, pieces of image data included in each of the ranges A1 to A9 are taken at times closer to each other than a piece of image data in an arbitrary range and a piece of image data in another range. Thus, seeing the thumbnail image a9, the user assumes that the image data c5 is present in the range A9 of the display object data a9, and specifies the thumbnail image a9 in the list display 121. Then, the operating unit 56 supplies information on the specification of the thumbnail image by the user to the object range setting unit 93. In response to this, the object range setting unit 93 sets the range A9 of the display object data a9 corresponding to the thumbnail image a9 as an object range. Thus, a second list display control process is started so that pieces of image data that have longest picture taking intervals among pieces of image data set as the object range and are equal in number to the number (nine) of images simultaneously displayable at the time of list display are newly set as display object data.

Thereby, in place of the previous display object data, the first piece of image data a9 from the start of the range A9, the third piece of image data b1 from the start of the range A9, the fifth piece of image data b2 from the start of the range A9, the seventh piece of image data b3 from the start of the range A9, the 11th piece of image data b4 from the start of the range A9, the 18th piece of image data b5 from the start of the range A9, the 22nd piece of image data b6 from the start of the range A9, the 24th piece of image data b7 from the start of the range A9, and the 25th piece of image data b8 from the start of the range A9 have long picture taking intervals within the object range, and are thus newly set as display object data. Therefore, when the thumbnail image a9 in the list display 121 is specified, the thumbnail image a9 and the thumbnail images b1 to b8 corresponding to the display object data (image data) a9 and the pieces of display object data b1 to b8 are displayed in order of picture taking date and time in the list display 122, as indicated by an arrow P1.

When there is image data between the display object data a9 and the display object data b1 on the recording medium 42, for example, the thumbnail image a9 can be specified also in the list display 122 as in the list display 121. When the thumbnail image a9 is specified by the user, a range from the display object data a9 to image data preceding the display object data b1 becomes an object range for the next display object data setting process. Incidentally, description of the following thumbnail images b1 to b8 in the list display 122 is basically the same as in the list display 121, and therefore repeated description thereof will be omitted. However, since there is no image data between the display object data b7 and the display object data b8 (that is, since there is no image data taken between picture taking dates and times of the display object data b7 and the display object data b8), the thumbnail image b7 in the list display 122 cannot be selected or specified.

Thus, seeing the thumbnail images a9 and b1 to b8 in the list display 122 displayed on the LCD 58, the user assumes that the image data c5 is present in a range B4 from the display object data b4 of the thumbnail image b4 to image data preceding the display object data b5, and specifies the thumbnail image b4 in the list display 122, for example, by operating the operating unit 56 including the touch panel, the control keys or the like. Then, the operating unit 56 supplies information on the specification of the thumbnail image by the user to the object range setting unit 93. In response to this, the object range setting unit 93 sets the range B4 of the display object data b4 corresponding to the thumbnail image b4 as an object range. Thus, a third list display control process is started. In this case, since the number of pieces of image data set as the object range is not larger than the number (nine) of images simultaneously displayable at the time of list display, the image data b4 and the pieces of image data c1 to c6 are newly set as display object data.

Thereby, in place of the previous display object data, the image data b4 and the six pieces of image data c1 to c6 in the range B4 are newly set as display object data. Therefore, when the thumbnail image b4 in the list display 122 is specified, the thumbnail image b4 and the thumbnail images c1 to c6 corresponding to the display object data (image data) b4 and the pieces of display object data c1 to c6 are displayed in order of picture taking date and time in the list display 123, as indicated by an arrow P2.

As described above, a range from display object data of a specified thumbnail image to image data preceding display object data of a next thumbnail image is set as an object range. Of pieces of image data set as the object range, pieces of image data that have longest picture taking intervals and are equal in number to the number (nine) of images simultaneously displayable at the time of list display are set as display object data. Thumbnail images of the set display object data are displayed. By specifying a displayed thumbnail image, thumbnail images of image data having picture taking times closer to that of the specified thumbnail image (than the other thumbnail images) are displayed.

Hence, in searching the 96 pieces of image data recorded on the recording medium 42 for the 85th piece of image data, the 85th piece of image data can be reached by a minimum of three operations. It is thus possible to reduce a number of operations as compared with the conventional example that requires at least 10 scroll operations as described above with reference to FIG. 3. In addition, in changing the list display, it suffices only to specify a desired thumbnail image, which is an easy operation, and unlike the example of FIG. 3, display of a relative position of displayed data on the recording medium 42 and a scroll function are not required. It is therefore possible to reduce cost, manufacturing processes and the like.

The display object data setting process in step S7 in FIG. 7 will next be described with reference to a flowchart of FIG. 10. In step S6 in FIG. 7, the picture taking interval calculating unit 92 calculates picture taking intervals of image data in an object range. Thus, the calculation object setting unit 101 of the display object setting unit 94 sets all the picture taking intervals of the image data which intervals are calculated by the picture taking interval calculating unit 92 as calculation objects in step S21 in FIG. 10. The calculation object setting unit 101 supplies information on the set calculation objects to the average value calculating unit 102. The process proceeds to step S22.

In step S22, the average value calculating unit 102 calculates an average value of the picture taking intervals of the calculation objects set by the calculation object setting unit 101. The average value calculating unit 102 then supplies the calculated average value of the picture taking intervals as a reference value of the picture taking intervals to the display candidate specifying unit 103. The process proceeds to step 23. In step S23, the display candidate specifying unit 103 compares the picture taking interval of each piece of image data with the reference value of the picture taking intervals from the average value calculating unit 102, specifies image data of a longer picture taking interval than the reference value of the picture taking intervals as a display candidate, and then supplies information of the specified display candidate to the display number determining unit 104. The process proceeds to step S24.

A display candidate specifying process in step S23 in FIG. 10 will be described concretely with reference to FIG. 11. In the example of FIG. 11, 29 pieces of image data are recorded on the recording medium 42, the pieces of image data are sorted in order of picture taking date and time, and picture taking intervals of the image data (with reference to preceding image data) in an object range (all image data recorded on the recording medium 42 in this case) are calculated.

In the example of FIG. 11, the picture taking interval of the image data having a data name "P001," a picture taking date "2003/2/22" (denoting Feb. 22, 2003), and a picture taking time "3:21:53" (denoting three twenty-one and 53 seconds) is not calculated because the image data has the oldest picture taking date and time. The picture taking interval (with respect to preceding image data) of the image data having a data name "P002," a picture taking date "2003/2/22," and a picture taking time "3:21:58" is "0:00:05" (five seconds). The picture taking interval of the image data having a data name "P003," a picture taking date "2003/2/22," and a picture taking time "3:22:21" is "0:00:23" (23 seconds). The picture taking interval of the image data having a data name "P004," a picture taking date "2003/2/22," and a picture taking time "12:25:35" is "9:03:14" (nine hours, three minutes, and 14 seconds). The picture taking interval of the image data having a data name "P005," a picture taking date "2003/2/22," and a picture taking time "12:25:40" is "0:00:05" (five seconds).

Similarly, the picture taking interval of the image data having a data name "P006," a picture taking date "2003/2/22," and a picture taking time "12:43:39" is "0:17:59" (17 minutes and 59 seconds). The picture taking interval of the image data having a data name "P007," a picture taking date "2003/2/22," and a picture taking time "13:02:16" is "0:18:37" (18 minutes and 37 seconds). The picture taking interval of the image data having a data name "P008," a picture taking date "2003/2/22," and a picture taking time "13:02:22" is "0:00:06" (six seconds). The picture taking interval of the image data having a data name "P009," a picture taking date "2003/2/22," and a picture taking time "13:13:41" is "0:11:19" (11 minutes and 19 seconds). The picture taking interval of the image data having a data name "P010," a picture taking date "2003/2/22," and a picture taking time "13:18:29" is "0:04:48" (four minutes and 48 seconds). The picture taking interval of the image data having a data name "P011," a picture taking date "2003/2/22," and a picture taking time "13:18:34" is "0:00:05" (five seconds). The picture taking interval of the image data having a data name "P012," a picture taking date "2003/2/22," and a picture taking time "13:52:23" is "0:33:49" (33 minutes and 49 seconds). The picture taking interval of the image data having a data name "P013," a picture taking date "2003/2/22," and a picture taking time "13:52:29" is "0:00:06" (six seconds).

The picture taking interval of the image data having a data name "P014," a picture taking date "2003/2/22," and a picture taking time "13:52:34" is "0:00:05" (five seconds). The picture taking interval of the image data having a data name "P015," a picture taking date "2003/2/22," and a picture taking time "14:02:20" is "0:09:46" (nine minutes and 46 seconds). The picture taking interval of the image data having a data name "P016," a picture taking date "2003/2/22," and a picture taking time "14:09:04" is "0:06:44" (six minutes and 44 seconds). The picture taking interval of the image data having a data name "P017," a picture taking date "2003/2/22," and a picture taking time "14:09:09" is "0:00:05" (five seconds). The picture taking interval of the image data having a data name "P018," a picture taking date "2003/2/22," and a picture taking time "14:41:14" is "0:32:05" (32 minutes and five seconds). The picture taking interval of the image data having a data name "P019," a picture taking date "2003/2/22," and a picture taking time "14:41:16" is "0:00:02" (two seconds). The picture taking interval of the image data having a data name "P020," a picture taking date "2003/2/22," and a picture taking time "14:41:19" is "0:00:03" (three seconds). The picture taking interval of the image data having a data name "P021," a picture taking date "2003/2/22," and a picture taking time "16:32:42" is "1:51:23" (one hour, 51 minutes, and 23 seconds).

Further, the picture taking interval of the image data having a data name "P022," a picture taking date "2003/2/22," and a picture taking time "16:32:44" is "0:00:02" (two seconds). The picture taking interval of the image data having a data name "P023," a picture taking date "2003/2/22," and a picture taking time "18:55:25" is "2:22:41" (two hours, 22 minutes, and 41 seconds). The picture taking interval of the image data having a data name "P024," a picture taking date "2003/2/22," and a picture taking time "18:55:36" is "0:00:11" (11 seconds). The picture taking interval of the image data having a data name "P025," a picture taking date "2003/2/22," and a picture taking time "18:55:40" is "0:00:04" (four seconds). The picture taking interval of the image data having a data name "P026," a picture taking date "2003/2/22," and a picture taking time "18:55:44" is "0:00:04" (four seconds). The picture taking interval of the image data having a data name "P027," a picture taking date "2003/2/22," and a picture taking time "19:03:56" is "0:08:12" (eight minutes and 12 seconds). The picture taking interval of the image data having a data name "P028," a picture taking date "2003/2/22," and a picture taking time "19:04:00" is "0:00:04" (four seconds). The picture taking interval of the image data having a data name "P029," a picture taking date "2003/2/22," and a picture taking time "19:04:04" is "0:00:04" (four seconds).

When an average value of the picture taking intervals is 30 minutes, for example, longer than 30 minutes among the picture taking intervals of the image data recorded on the recording medium 42 are the picture taking interval "nine hours, three minutes, and 14 seconds" of the image data "P004," the picture taking interval "33 minutes and 49 seconds" of the image data "P012," the picture taking interval "32 minutes and five seconds" of the image data "P018," the picture taking interval "one hour, 51 minutes, and 23 seconds" of the image data "P021," and the picture taking interval "two hours, 22 minutes, and 41 seconds" of the image data "P023," as shown by hatching in FIG. 11. Thus, the display candidate specifying unit 103 specifies these five pieces of image data as display candidates.

When the average value of the picture taking intervals is nine minutes, for example, longer than nine minutes among the picture taking intervals of the image data recorded on the recording medium 42 are the picture taking interval "17 minutes and 59 seconds" of the image data "P006," the picture taking interval "18 minutes and 37 seconds" of the image data "P007," the picture taking interval "11 minutes and 19 seconds" of the image data "P009," and the picture taking interval "nine minutes and 46 seconds" of the image data "P015" as indicated by black frames in FIG. 11 in addition to the picture taking intervals of the above-mentioned five pieces of image data.

Thus, when the reference value of the picture taking intervals is set as nine minutes, the display candidate specifying unit 103 specifies the above-mentioned nine pieces of image data as display candidates.

In this case, the nine pieces of image data set as display candidates are equal in number to the number (for example nine) of images displayable in list display, and therefore set as display object data by a process of step S28 in FIG. 10 to be described later. Thumbnail image data of the set display object data is read from the recording medium 42. Thereby, as shown by a display screen 141, a list display of thumbnail images corresponding to the pieces of image data "P004," "P006," "P007," "P009," "P012," "P015," "P018," "P021," and "P023" set as the display object data is made in three rows and three columns on the LCD 58 in order of picture taking date and time.

As described above, the display candidate specifying unit 103 specifies image data of a longer picture taking interval than the reference value of the picture taking intervals. When the reference value of the picture taking intervals is changed, a number of pieces of image data having longer picture taking intervals (number of display candidates) is also changed. Hence, in a process from step S24 on down in FIG. 10 to be described later, the number of display candidates specified by the display candidate specifying unit 103 is compared with the number of images displayable in list display. When the number of display candidates is not equal to the number of images displayable in list display, calculation objects for obtaining the average value of picture taking intervals are reset, thus dynamically changing the reference value of the picture taking intervals. The display candidate specifying unit 103 specifies display candidates having longer picture taking intervals than the reference value of the picture taking intervals again. By repeating the above process, the display candidate specifying unit 103 can eventually obtain display candidates equal in number to the number of images simultaneously displayable at the time of list display.

Returning to FIG. 10, the display number determining unit 104 in step S24 compares the number of display candidates specified by the display candidate specifying unit 103 with the number of images simultaneously displayable at the time of list display to determine whether the number of display candidates is not larger than the number of displayable images. When the display number determining unit 104 determines that the number of display candidates is larger than the number of displayable images, to further reduce the number of set display candidates, the process proceeds to step S25, where the display number determining unit 104 controls the calculation object setting unit 101 to set picture taking intervals of image data not specified as display candidates last time but specified by the display candidate specifying unit 103 as display candidates among the picture taking intervals of the image data as calculation objects. The process returns to step S22 to repeat a process from step S22 on down. Incidentally, in the process for a first time, previous display candidates are not taken into consideration.

The display number determining unit 104 in step S24 compares the number of display candidates specified by the display candidate specifying unit 103 with the number of images simultaneously displayable at the time of list display. When the display number determining unit 104 determines that the number of display candidates is not larger than the number of displayable images, the process proceeds to step S26, where the display number determining unit 104 determines whether the number of display candidates is equal to the number of displayable images. When the display number determining unit 104 determines that the number of display candidates is not equal to the number of displayable images (that is, the number of display candidates is smaller than the number of displayable images), the process proceeds to step S27, where to further increase the number of display candidates using non-display candidates, the display number determining unit 104 controls the calculation object setting unit 101 to set picture taking intervals of image data specified as display candidates last time but specified by the display candidate specifying unit 103 as non-display candidates (not specified as display candidates) among the picture taking intervals of the image data as calculation objects. The process returns to step S22 to repeat a process from step S22 on down. Incidentally, in the process for a first time, previous display candidates are not taken into consideration.

When the display number determining unit 104 determines in step S26 that the number of display candidates is equal to the number of displayable images, the process proceeds to step S28, where the display number determining unit 104 controls the display data setting unit 105 to set the image data of the display candidates as display object image data. The display data setting unit 105 in step S28 sets the image data specified as display candidates by the display candidate specifying unit 103 as display object data under control of the display number determining unit 104. The display data setting unit 105 then supplies information on the set display object data to the display data generating unit 95. The process returns to step S9 in FIG. 7.

As described above, the average value (reference value) of the picture taking intervals is obtained. The image data of picture taking intervals longer than the obtained reference value is set as display candidates. When the number of set display candidates is equal to the number of images displayable in list display, the image data of the display candidates is set as display object data. The set display object data is image data of picture taking intervals longer than the average value (reference value) of the picture taking intervals which value is dynamically set by changing calculation objects as objects for obtaining the average value of the picture taking intervals so that the number of display candidates becomes equal to the number of images displayable in list display, and is pieces of image data that have longest picture taking intervals among the pieces of image data in the object range and are equal in number to the number of images simultaneously displayable at the time of list display.

Figure 10:
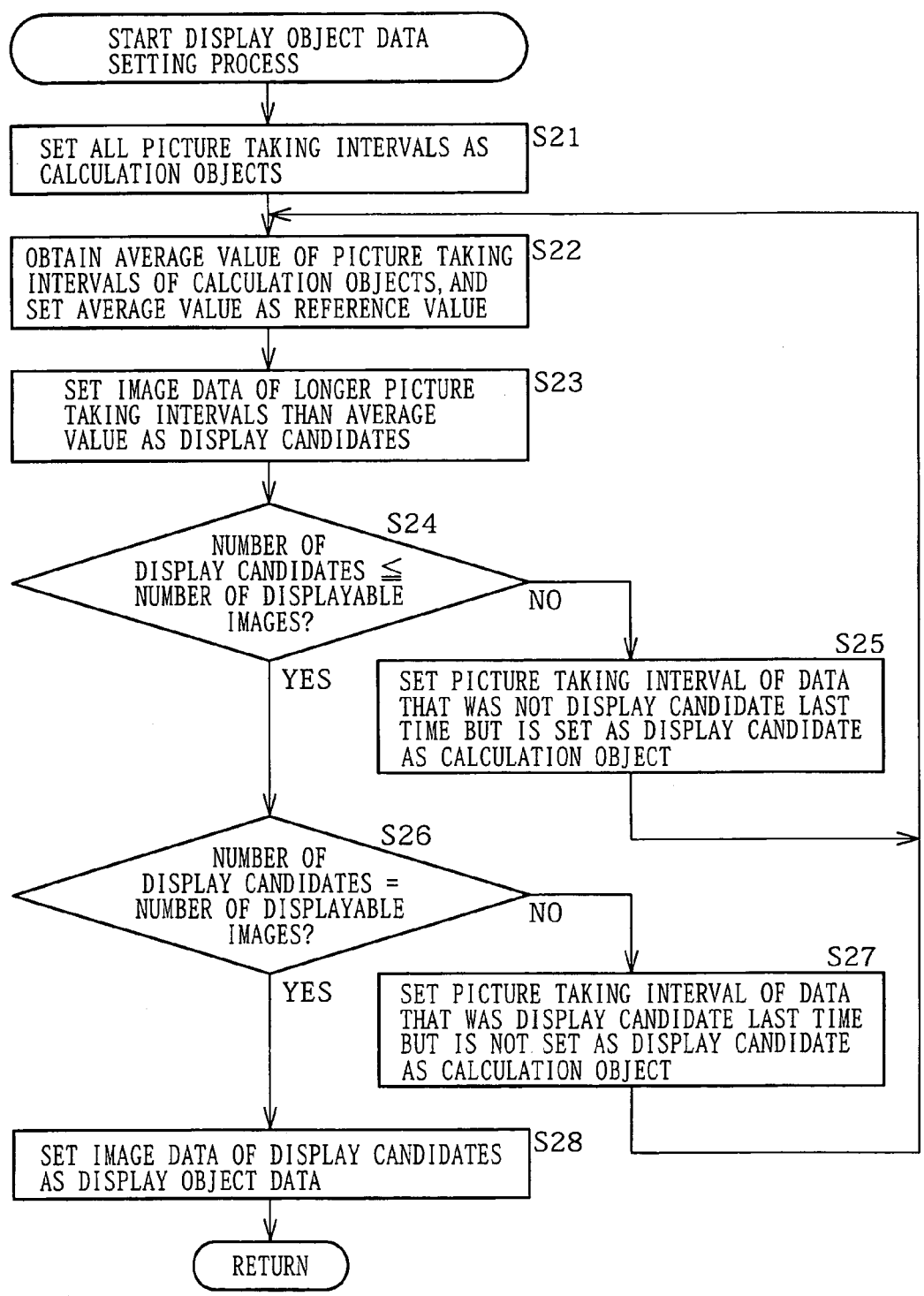
FIG. 10 is a flowchart of assistance in explaining an example of a display object data setting process in step S7 in FIG. 7.

Thus, in the display object data setting process of FIG. 10, the average value (reference value) of the picture taking intervals is obtained. The image data of picture taking intervals longer than the obtained reference value is set as display candidates. When the number of set display candidates is equal to the number of images displayable in list display, image data of display candidates that have longest picture taking intervals among the pieces of image data in the object range and are equal in number to the number of images simultaneously displayable at the time of list display is set as display object data. It is to be noted that the display object data setting process of FIG. 10 is one example; another process may be used as long as the process sets image data of display candidates that have longest picture taking intervals among the pieces of image data in the object range and are equal in number to the number of images simultaneously displayable at the time of list display as display object data.

Incidentally, while a branch for the case where the number of display candidates is smaller than the number of displayable images is provided to step S26 in FIG. 10, since the display candidates can be displayed in list display even when the number of display candidates is smaller than the number of displayable images, the display candidates may be displayed in list display as in the case where the number of display candidates is equal to the number of displayable images, without a branch being provided for the case where the number of display candidates is smaller than the number of displayable images.

A concrete example of the display object data setting process of FIG. 10 will next be described with reference to FIG. 12. In FIG. 12, parts corresponding to those in FIG. 11 are identified by corresponding references, and repeated description thereof will be omitted. In the example of FIG. 12, on a right side of the picture taking interval of each piece of image data, "1" is shown for the image data set as a display candidate in process results of a first to a fifth display candidate setting process in step S23 in FIG. 10, that is, in the first to fifth display candidate setting processes, and "0" is shown for the image data not set as a display candidate.

In the example of FIG. 12, the average value calculating unit 102 obtains an average value of picture taking intervals as a reference value X1 (about 33 minutes and 38 seconds in actuality) from the picture taking intervals of 28 pieces of image data. Specifically, in a first display candidate setting, the picture taking intervals (hatched picture taking intervals) of all the image data recorded on the recording medium 42 are set as calculation objects. Of the picture taking intervals of all the image data as the calculation objects, the picture taking interval "nine hours, three minutes, and 14 seconds" of the image data "P004," the picture taking interval "33 minutes and 49 seconds" of the image data "P012," the picture taking interval "one hour, 51 minutes, and 23 seconds" of the image data "P021," and the picture taking interval "two hours, 22 minutes, and 41 seconds" of the image data "P023," which are indicated by "1" in a column of a "first time," are judged to be longer than the reference value X1. Thus, these four pieces of image data are set as display candidates. However, since the four pieces of image data are less than the number (for example nine) of images displayable in list display, to further increase the number of display candidates through selection from among the pieces of image data not specified as display candidates (non-display candidates), the calculation object setting unit 101 sets the picture taking intervals of pieces of image data specified as non-display candidates by the display candidate specifying unit 103 (hatched in the column of the "first time") as calculation objects.

Thus, the average value calculating unit 102 obtains an average value of picture taking intervals as a reference value X2 (about four minutes and 37 seconds in actuality) with the picture taking intervals of 24 pieces of image data as calculation objects. Specifically, in a second display candidate setting process, the picture taking intervals of the 24 pieces of image data which intervals are hatched in the column of the "first time" are set as calculation objects. Of the picture taking intervals of all the pieces of image data, in addition to the picture taking intervals of the four pieces of image data mentioned above, the picture taking interval "17 minutes and 59 seconds" of the image data "P006," the picture taking interval "18 minutes and 37 seconds" of the image data "P007," the picture taking interval "11 minutes and 19 seconds" of the image data "P009," the picture taking interval "four minutes and 48 seconds" of the image data "P010," the picture taking interval "nine minutes and 46 seconds" of the image data "P015," the picture taking interval "six minutes and 44 seconds" of the image data "P016," the picture taking interval "32 minutes and five seconds" of the image data "P018," and the picture taking interval "eight minutes and 12 seconds" of the image data "P027," which are indicated by "1" in a column of a "second time," are judged to be longer than the reference value X2. Thus, these 12 pieces of image data are set as display candidates. However, since the 12 pieces of image data are more than the number (for example nine) of images displayable in list display, to reduce the number of display candidates through selection from among the pieces of image data specified as display candidates in the second process, the calculation object setting unit 101 sets the picture taking intervals of pieces of image data not set as display candidates in the first process (previous time) but specified as display candidates by the display candidate specifying unit 103 in the second process (hatched in the column of the "second time") as calculation objects.

Thus, the average value calculating unit 102 obtains an average value of picture taking intervals as a reference value X3 (about 14 minutes and three seconds in actuality) with the picture taking intervals of seven pieces of image data as calculation objects. Specifically, in a third display candidate setting process, the picture taking intervals of the seven pieces of image data which intervals are hatched in the column of the "second time" are set as calculation objects. Of the picture taking intervals of all the pieces of image data, the picture taking interval "nine hours, three minutes, and 14 seconds" of the image data "P004," the picture taking interval "17 minutes and 59 seconds" of the image data "P006," the picture taking interval "18 minutes and 37 seconds" of the image data "P007," the picture taking interval "33 minutes and 49 seconds" of the image data "P012," the picture taking interval "32 minutes and five seconds" of the image data "P018," the picture taking interval "one hour, 51 minutes, and 23 seconds" of the image data "P021," and the picture taking interval "two hours, 22 minutes, and 41 seconds" of the image data "P023," which are indicated by "1" in a column of a "third time," are judged to be longer than the reference value X3. Thus, these seven pieces of image data are set as display candidates. However, since the seven pieces of image data are less than the number (for example nine) of images displayable in list display, to increase the number of display candidates through selection from among the pieces of image data not specified as display candidates in the third process, the calculation object setting unit 101 sets the picture taking intervals of pieces of image data set as display candidates in the second process (previous time) but not set as display candidates in the third process (hatched in the column of the "third time") as calculation objects.

Thus, the average value calculating unit 102 obtains an average value of picture taking intervals as a reference value X4 (about eight minutes and nine seconds in actuality) with the picture taking intervals of five pieces of image data as calculation objects. Specifically, in a fourth display candidate setting process, the picture taking intervals of the five pieces of image data which intervals are hatched in the column of the "third time" are set as calculation objects. Of the picture taking intervals of all the pieces of image data, the picture taking interval "nine hours, three minutes, and 14 seconds" of the image data "P004," the picture taking interval "17 minutes and 59 seconds" of the image data "P006," the picture taking interval "18 minutes and 37 seconds" of the image data "P007," the picture taking interval "11 minutes and 19 seconds" of the image data "P009," the picture taking interval "33 minutes and 49 seconds" of the image data "P012," the picture taking interval "nine minutes and 46 seconds" of the image data "P015," the picture taking interval "32 minutes and five seconds" of the image data "P018," the picture taking interval "one hour, 51 minutes, and 23 seconds" of the image data "P021," the picture taking interval "two hours, 22 minutes, and 41 seconds" of the image data "P023," and the picture taking interval "eight minutes and 12 seconds" of the image data "P027," which are indicated by "1" in a column of a "fourth time," are judged to be longer than the reference value X4. Thus, these 10 pieces of image data are set as display candidates. However, since the 10 pieces of image data are more than the number (for example nine) of images displayable in list display, to reduce the number of display candidates through selection from among the pieces of image data specified as display candidates in the fourth process, the calculation object setting unit 101 sets the picture taking intervals of pieces of image data not set as display candidates in the third process (previous time) but set as display candidates in the fourth process (hatched in the column of the "fourth time") as calculation objects.

Thus, the average value calculating unit 102 obtains an average value of picture taking intervals as a reference value X5 (about nine minutes and 45 seconds in actuality) with the picture taking intervals of three pieces of image data as calculation objects. Specifically, in a fifth display candidate setting process, the picture taking intervals of the three pieces of image data which intervals are hatched in the column of the "fourth time" are set as calculation objects. Of the picture taking intervals of all the pieces of image data, the picture taking interval "nine hours, three minutes, and 14 seconds" of the image data "P004," the picture taking interval "17 minutes and 59 seconds" of the image data "P006," the picture taking interval "18 minutes and 37 seconds" of the image data "P007," the picture taking interval "11 minutes and 19 seconds" of the image data "P009," the picture taking interval "33 minutes and 49 seconds" of the image data "P012," the picture taking interval "nine minutes and 46 seconds" of the image data "P015," the picture taking interval "32 minutes and five seconds" of the image data "P018," the picture taking interval "one hour, 51 minutes, and 23 seconds" of the image data "P021," and the picture taking interval "two hours, 22 minutes, and 41 seconds" of the image data "P023," which are indicated by "1" in a column of a "fifth time," are judged to be longer than the reference value X5. Thus, these nine pieces of image data, which are indicated by "1" in the column of the "fifth time," are set as display candidates. Since the nine pieces of image data are equal to the number (for example nine) of images displayable in list display, the nine pieces of image data set as display candidates are set as display object data. The display object data set at this time is the nine pieces of image data having the longest picture taking intervals among the pieces of image data in the object range, as indicated by the picture taking intervals of the display object data in FIG. 12.

As described above, of the pieces of image data in the object range set by the object range setting unit 93 on the recording medium 42 (of the pieces of image data recorded on the recording medium 42 in this case), pieces of image data of longer picture taking intervals than the dynamically set picture taking interval reference value are set as display candidates. When the set display candidates are equal in number to the number of images simultaneously displayable at the time of list display, the display candidates are set as display object data. That is, in other words, pieces of image data that have longest picture taking intervals among the pieces of image data in the object range and are equal in number to the number of displayable images are set as display object data. Thus, list display data including thumbnail images corresponding to the pieces of image data "P004," "P006," "P007," "P009," "P012," "P015," "P018," "P021," and "P023" set as the display object data is generated. On the basis of the generated list display data, the display screen 141 in FIG. 11 is displayed on the LCD 58.

Incidentally, while in the example of FIG. 12, the first piece of image data "P001" is not set as display object data, the first piece of image data "P001" may be set as display object data in advance. In this case, other display object data is obtained with the number of images displayable in list display set at eight.

Figure 13:
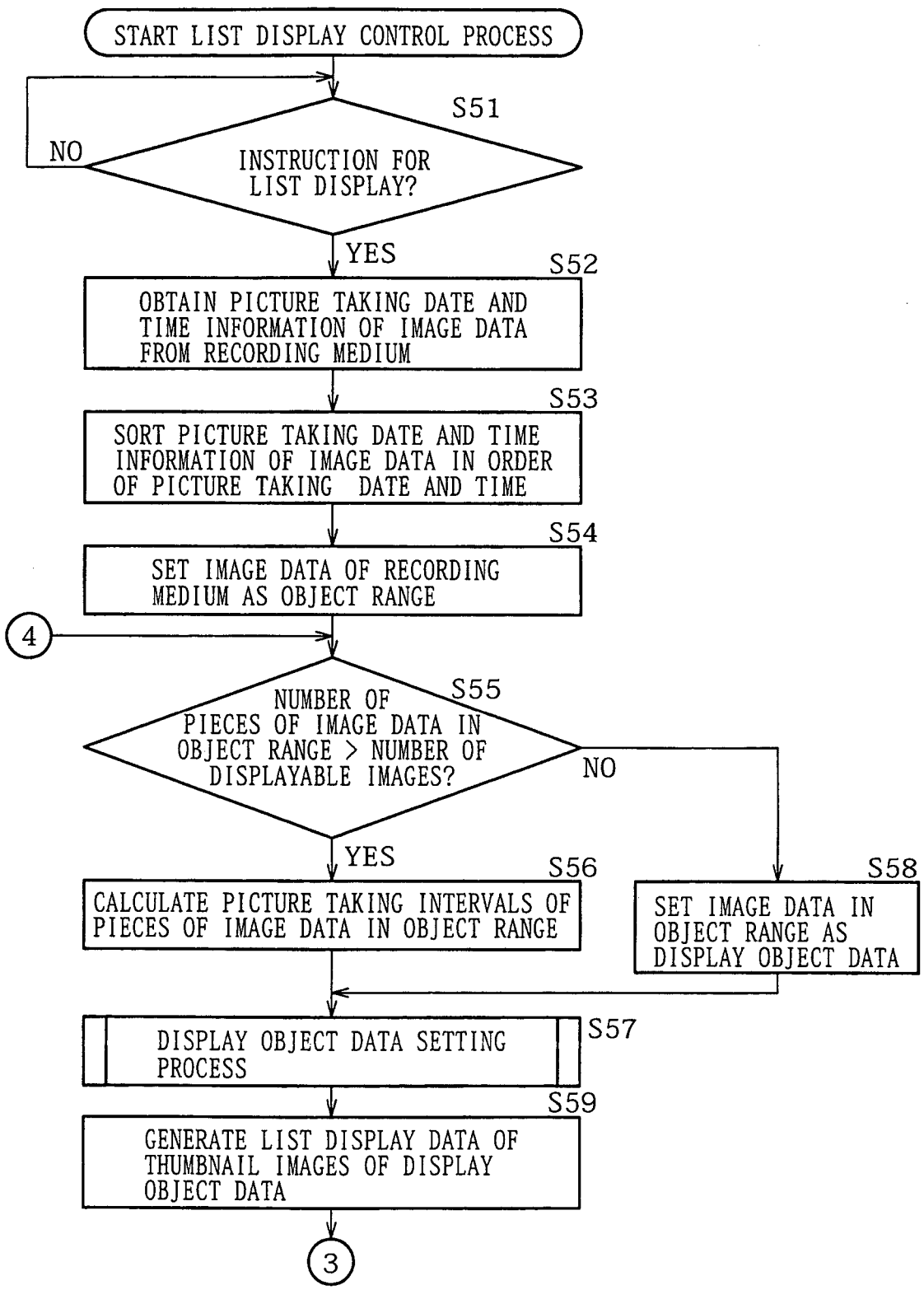
FIG. 13 is a flowchart of assistance in explaining another example of the list display control process of the picture taking apparatus in FIG. 4.
Figure 14:
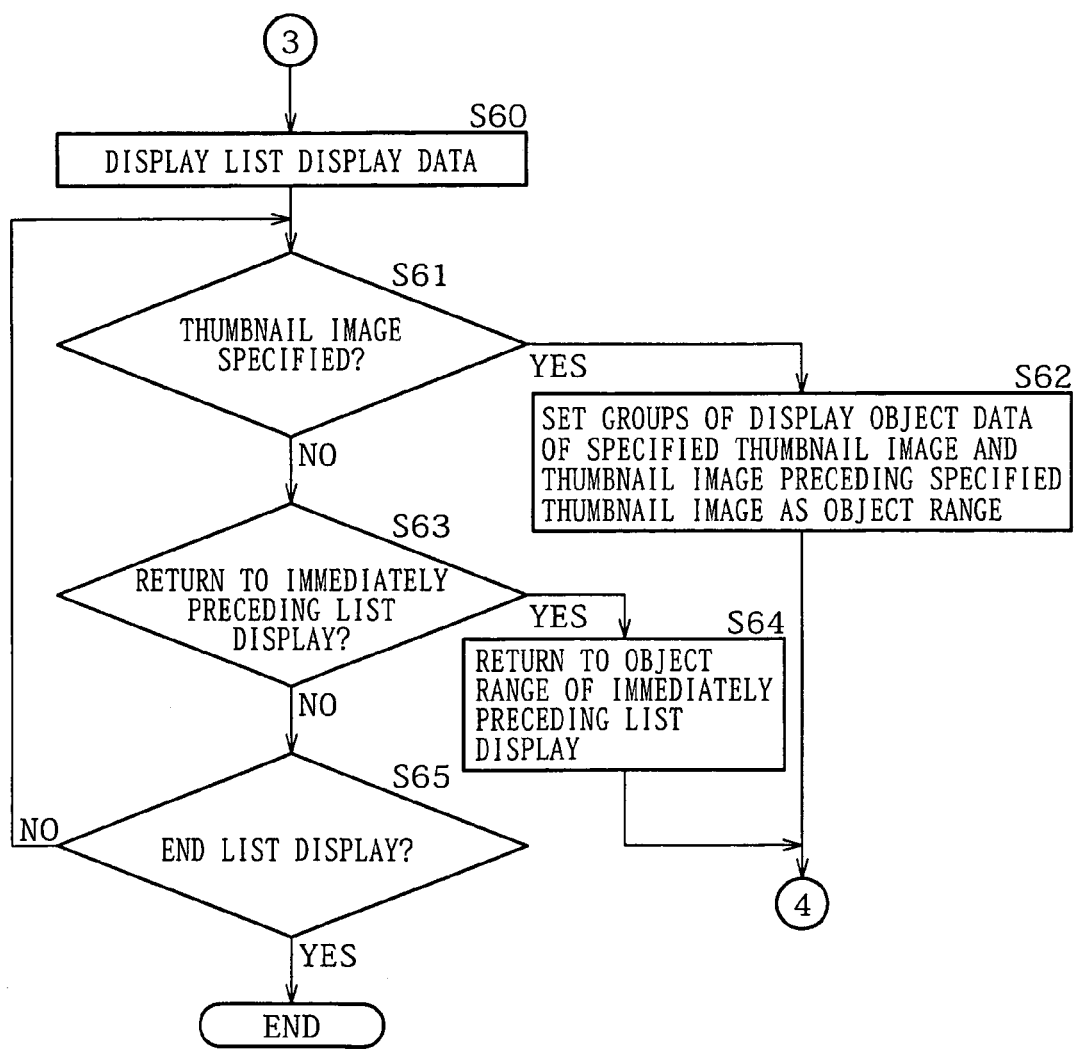
FIG. 14 is a flowchart of assistance in explaining the other example of the list display control process of the picture taking apparatus in FIG. 4.

Another example of the list display control process of the picture taking apparatus 41 will next be described with reference to flowcharts of FIG. 13 and FIG. 14. Incidentally, except for step S62, the process in FIG. 13 and FIG. 14 is basically the same as the steps other than step S12 in FIG. 7 and FIG. 8, and therefore detailed description thereof will be omitted as appropriate. The image information obtaining unit 91 stands by in step S51 until an instruction for list display of image data recorded on the recording medium 42 is given. The image information obtaining unit 91 determines that an instruction for list display of image data recorded on the recording medium 42 is given on the basis of the instruction supplied from the operating unit 56. The process proceeds to step S52, where the image information obtaining unit 91 reads picture taking date and time information or the like of the image data recorded on the recording medium 42 from the recording medium 42 via the medium I/F 54. The process proceeds to step S53, where the image information obtaining unit 91 sorts the read picture taking date and time information in order of picture taking date and time, and then supplies the sorted picture taking date and time information to the picture taking interval calculating unit 92. The process proceeds to step S54.

In step S54, the object range setting unit 93 sets all the image data recorded on the recording medium 42 as a list display object range. The process proceeds to step S55, where the object range setting unit 93 determines whether a number of pieces of image data in the set object range is larger than a number of images displayable in list display. When the object range setting unit 93 determines that the number of pieces of image data in the set object range is larger than the number of images displayable in list display, the object range setting unit 93 supplies information of the set object range to the picture taking interval calculating unit 92. The process proceeds to step S56. In step S56, the picture taking interval calculating unit 92 calculates picture taking intervals of the image data in the object range set by the object range setting unit 93 on the basis of the picture taking date and time information sorted by the image information obtaining unit 91. The picture taking interval calculating unit 92 supplies the calculated picture taking intervals of the image data to the display object setting unit 94. The process proceeds to step S57.

After the picture taking interval calculating unit 92 calculates the picture taking intervals of the image data, the display object setting unit 94 performs the display object data setting process described above with reference to FIG. 10 in step S57. The process proceeds to step S59. By the display object data setting process, pieces of image data that have longest picture taking intervals among the pieces of image data in the object range and are not more than the number of images simultaneously displayable in list display are set as display object data, and then information of the set display object data is outputted to the display data generating unit 95.

On the other hand, when the object range setting unit 93 determines in step S55 that the number of pieces of image data in the set object range is not larger than the number of images displayable in list display, the object range setting unit 93 supplies information of the set object range to the display data setting unit 105. The process proceeds to step S58. The display data setting unit 105 sets the image data in the object range as display object data under control of the object range setting unit 93, and then outputs information of the display object data to the display data generating unit 95. The process proceeds to step S59.

In step S59, the display data generating unit 95 reads thumbnail image data corresponding to the display object data set by the display object setting unit 94 from the recording medium 42, generates list display data including the thumbnail images arranged in order of picture taking date and time, and then supplies the generated list display data to the LCD controller 57. The process proceeds to step S60 in FIG. 14. In step S60, the LCD controller 57 makes a list display on the LCD 58 on the basis of the list display data from the display data generating unit 95. The process proceeds to step S61.

Viewing the list display of the thumbnail images displayed on the LCD 58, the user operates the operating unit 56 including the touch panel, the control keys or the like to specify one thumbnail image in the list display, give an instruction to return to an immediately preceding list display, or give an instruction to end the list display. In response to this, the operating unit 56 supplies instruction information from the user to the object range setting unit 93. In step S61, the object range setting unit 93 determines whether a thumbnail image is specified on the basis of the information supplied from the operating unit 56. When the object range setting unit 93 determines that a thumbnail image is specified, the process proceeds to step S62, where the object range setting unit 93 sets, as an object range, pieces of image data from display object data of the thumbnail image preceding the thumbnail image specified by the user to a piece of image data preceding display object data of a thumbnail image following the specified thumbnail image (that is, an image group of the preceding display object data and an image group of the specified display object data). The process returns to step S55 in FIG. 13 to repeat a subsequent process from step S55 on down. That is, the subsequent process from step S55 on down deals with only the image data in the object range set in step S62 in FIG. 14 to set display object data.

When the object range setting unit 93 determines in step S61 that no thumbnail image is specified, the process proceeds to step S63, where the object range setting unit 93 determines whether a return to an immediately preceding list display is to be made on the basis of the information supplied from the operating unit 56. When the object range setting unit 93 determines that a return to the immediately preceding list display is to be made, the object range setting unit 93 returns a setting to an object range of the immediately preceding list display in step S64. The process returns to step S55 in FIG. 13 to repeat a subsequent process from step S55 on down.

Further, when the object range setting unit 93 determines in step S63 that no thumbnail image is specified, the process proceeds to step S65, where the object range setting unit 93 determines whether the list display is to be ended on the basis of the information supplied from the operating unit 56. When the object range setting unit 93 determines that the list display is to be ended, the list display control process is ended. When the object range setting unit 93 determines that the list display is not to be ended, the process returns to step S61 to repeat a subsequent process from step S61 on down.

As described above, on the recording medium 42, the image groups of the display object data corresponding to the specified thumbnail image and the thumbnail image immediately preceding the specified thumbnail image are set as the object range. Pieces of image data that have longest picture taking intervals among the pieces of image data in the object range and are equal in number to the number of images simultaneously displayable at the time of list display are set as display object data. Thumbnail images of the set display object data are displayed in a list in order of picture taking date and time.

An example of a list display as described above will be described with reference to FIG. 15. Incidentally, in FIG. 15, parts corresponding to those in FIG. 9 are identified by corresponding references, and repeated description thereof will be omitted.

Figure 15:
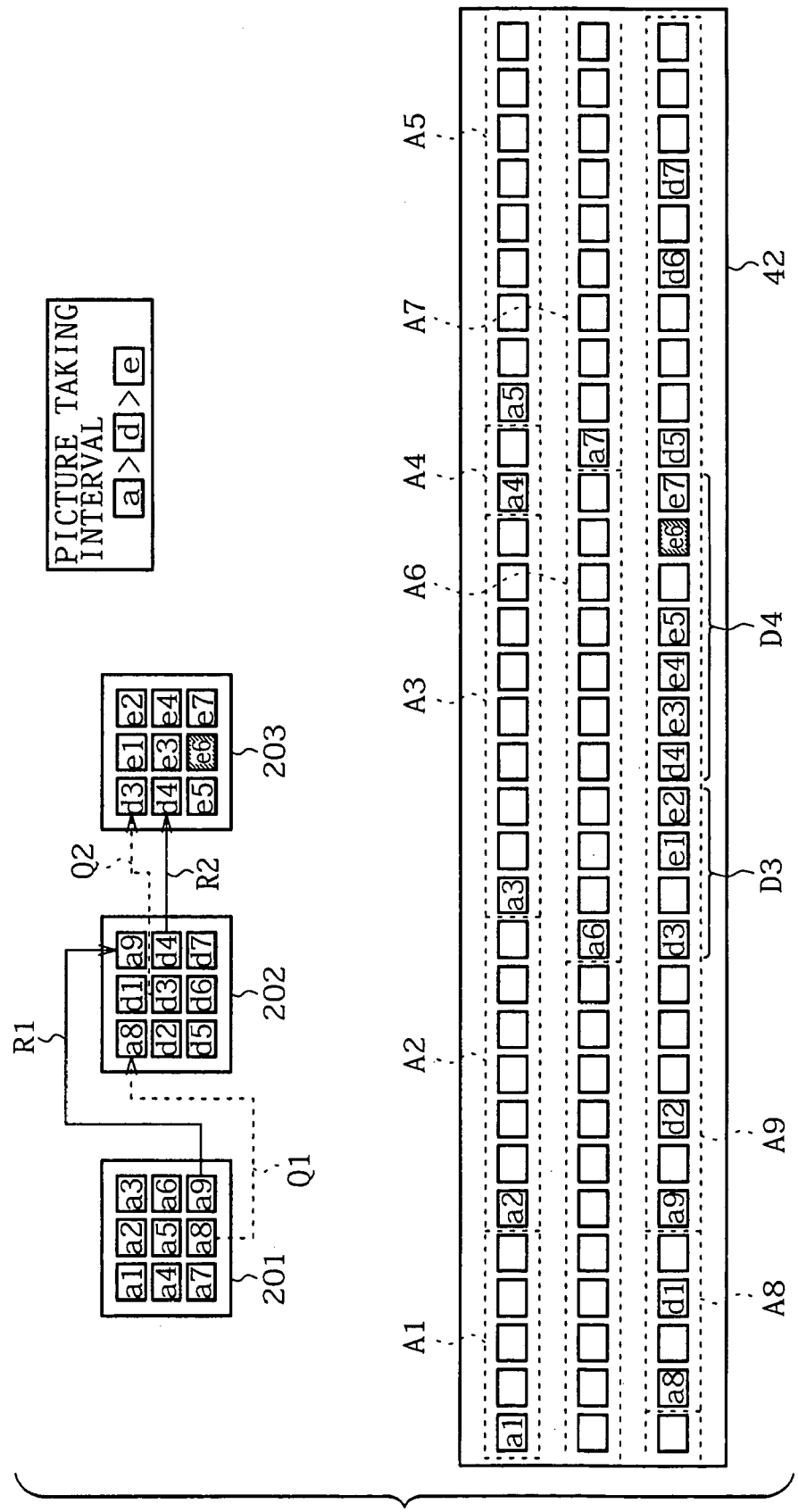
FIG. 15 is a diagram of assistance in explaining the list display control process of FIG. 13 and FIG. 14.

In the example of FIG. 15, three list display examples 201 to 203 are shown. In the list display 201, nine thumbnail images a1 to a9 of pieces of display object data a1 to a9 of image data recorded on the recording medium 42 are displayed. In the list display 202, nine thumbnail images a8 and a9 and d1 to d7 of the pieces of display object data a8 and a9 and pieces of display object data d1 to d7 (the pieces of display object data d1 to d7 will hereinafter be referred to collectively as display object data d) of the image data recorded on the recording medium 42 are displayed. In the list display 203, nine thumbnail images d3 and d4 and e1 to e7 of the pieces of display object data d3 and d4 and pieces of display object data e1 to e7 (the pieces of display object data e1 to e7 will hereinafter be referred to collectively as display object data e) of the image data recorded on the recording medium 42 are displayed. Incidentally, as for length of picture taking intervals, an upper right portion of the figure shows that the picture taking interval of the display object data a> the picture taking interval of the display object data d > the picture taking interval of the display object data e.

A lower part of the figure showing the list displays 201 to 203 shows the recording medium 42, on which 96 pieces of image data are recorded in order of picture taking date and time. Also in the example of FIG. 15, suppose that a user is searching for the 85th piece of image data e6 (hatched in the figure) from a start of the 96 pieces of image data recorded on the recording medium 42.

First, as described above with reference to FIG. 13 and FIG. 14, a first list display control process sets the 96 pieces of image data recorded on the recording medium 42 as an object range, and sets, as the display object data a, pieces of image data that have longest picture taking intervals among the pieces of image data set as the object range and are equal in number to the number (nine) of images simultaneously displayable at the time of list display. In the example of FIG. 15, the first piece of image data a1 from the start of the recording medium 42, the sixth piece of image data a2 from the start, the 13th piece of image data a3 from the start, the 22nd piece of image data a4 from the start, the 24th piece of image data a5 from the start, the 44th piece of image data a6 from the start, the 55th piece of image data a7 from the start, the 63rd piece of image data a8 from the start, and the 70th piece of image data a9 from the start have long picture taking intervals within the object range, and are thus set as the display object data a. Therefore the thumbnail images a1 to a9 corresponding to the pieces of display object data (image data) a1 to a9 are displayed in order of picture taking date and time in the list display 201.

When there is image data between the display object data a1 and the display object data a2 on the recording medium 42, the thumbnail image a1 can be specified in the list display 201. When the thumbnail image a1 is specified by the user, a range A1 from the display object data a1 to image data preceding the display object data a2 become an object range for the next display object data setting process. When the thumbnail image a2 is specified by the user, the range A1 and a range A2 from the display object data a1 to image data preceding the display object data a3 become an object range for the next display object data setting process. That is, in the example of FIG. 15, a range from display object data of a thumbnail image immediately preceding a specified thumbnail image to image data preceding display object data of a thumbnail image following the specified thumbnail image is set as an object range.

Similarly, when the thumbnail image a3 is specified by the user, the range A2 and a range A3 from the display object data a2 to image data preceding the display object data a4 become an object range for the next display object data setting process. When the thumbnail image a4 is specified by the user, the range A3 and a range A4 from the display object data a3 to image data preceding the display object data a5 become an object range for the next display object data setting process.

Further, similarly, when the thumbnail image a5 is specified by the user, the range A4 and a range A5 from the display object data a4 to image data preceding the display object data a6 become an object range for the next display object data setting process. When the thumbnail image a6 is specified by the user, the range A5 and a range A6 from the display object data a5 to image data preceding the display object data a7 become an object range for the next display object data setting process. When the thumbnail image a7 is specified by the user, the range A6 and a range A7 from the display object data a6 to image data preceding the display object data a8 become an object range for the next display object data setting process. When the thumbnail image a8 is specified by the user, the range A7 and a range A8 from the display object data a7 to image data preceding the display object data a9 become an object range for the next display object data setting process. When the thumbnail image a9 is specified by the user, the range A8 and a range A9 from the display object data a8 to last image data on the recording medium 42 become an object range for the next display object data setting process.

Image data included in each of the ranges A1 to A9 has shorter picture taking intervals with reference to preceding image data than at least the image data set as the display object data a. That is, pieces of image data included in each of the ranges A1 to A9 are taken at times closer to each other than a piece of image data in an arbitrary range and a piece of image data in another range. Thus, seeing the thumbnail image a9, the user assumes that the image data e6 is present in the vicinity of the display object data a9, and specifies the thumbnail image a9 in the list display 201. Then, the operating unit 56 supplies information on the specification of the thumbnail image by the user to the object range setting unit 93. In response to this, the object range setting unit 93 sets the range A8 of the display object data a8 corresponding to the thumbnail image a8 preceding the thumbnail image a9 and the range A9 of the display object data a9 corresponding to the thumbnail image a9 as an object range. Thus, a second list display control process is started so that pieces of image data that have longest picture taking intervals among pieces of image data set as the object range and are equal in number to the number (nine) of images simultaneously displayable at the time of list display are newly set as display object data.

Thereby, in place of the previous display object data, the first piece of image data a8 from the start of the range A8, the third piece of image data d1 in the range A8, the first piece of image data a9 from the start of the range A9, the third piece of image data d2 from the start of the range A9, the seventh piece of image data d3 from the start of the range A9, the 11th piece of image data d4 from the start of the range A9, the 18th piece of image data d5 from the start of the range A9, the 22nd piece of image data d6 from the start of the range A9, and the 24th piece of image data d7 from the start of the range A9 have long picture taking intervals within the object range, and are thus newly set as display object data. Therefore, when the thumbnail image a9 in the list display 201 is specified, the list display 202 displays the thumbnail image a8 preceding the thumbnail image a9 and thumbnail images subsequent to the thumbnail image a8, that is, the thumbnail images a8, d1, and a9 and the thumbnail images d2 to d7 corresponding to the pieces of display object data (image data) a8, d1, and a9 and the pieces of display object data d2 to d7 in order of picture taking date and time. At this time, the thumbnail image a8 preceding the thumbnail image a9 is displayed at a first start position in the list display 202, as indicated by an arrow Q1, and the thumbnail image a9 is displayed at a position other than the start position in the list display 202, as indicated by an arrow R1.

When there is image data between the display object data d4 and the display object data d5 on the recording medium 42, for example, the thumbnail image d4 can be specified in the list display 202 as in the list display 201. When the thumbnail image d4 is specified by the user, a range from the display object data d3 to the last image data becomes an object range for the next display object data setting process.

Thus, seeing the thumbnail images a8, d1, and a9 and d2 to d7 in the list display 202 displayed on the LCD 58, the user assumes that the image data e6 is present in the vicinity of the display object data d4 of the thumbnail image d4, and specifies the thumbnail image d4 in the list display 202, for example, by operating the operating unit 56 including the touch panel, the control keys or the like. Then, the operating unit 56 supplies information on the specification of the thumbnail image by the user to the object range setting unit 93. In response to this, the object range setting unit 93 sets a range D3 of the display object data d3 corresponding to the thumbnail image d3 and a range D4 of the display object data d4 corresponding to the thumbnail image d4 as an object range. Thus, a third list display control process is started so that pieces of image data that have longest picture taking intervals among pieces of image data set as the object range and are equal in number to the number (nine) of images simultaneously displayable at the time of list display are newly set as display object data.

Thereby, in place of the previous display object data, the first piece of image data d3 from the start of the range D3, the third piece of image data e1 in the range D3, the fourth piece of image data e2 from the start of the range D3, the first piece of image data d4 from the start of the range D4, the second piece of image data e3 from the start of the range D4, the third piece of image data e4 from the start of the range D4, the fourth piece of image data e5 from the start of the range D4, the sixth piece of image data e6 from the start of the range D4, and the seventh piece of image data e7 from the start of the range D4 have long picture taking intervals within the object range, and are thus newly set as display object data. Therefore, when the thumbnail image d4 in the list display 202 is specified, the list display 203 displays the thumbnail image d3 preceding the thumbnail image d4 and thumbnail images subsequent to the thumbnail image d3, that is, the thumbnail images d3, e1, e2, and d4 and the thumbnail images e3 to e7 corresponding to the pieces of display object data (image data) d3, e1, e2, and d4 and the pieces of display object data e3 to e7 in order of picture taking date and time. At this time, the thumbnail image d3 preceding the thumbnail image d4 is displayed at a first start position in the list display 203, as indicated by an arrow Q2, and the thumbnail image d4 is displayed at a position other than the start position in the list display 203, as indicated by an arrow R2.

As described above, a range from display object data immediately preceding specified display object data to image data preceding display object data following the specified display object data can be set as an object range to display image data preceding and following the display object data of the specified thumbnail image. This is effective in a case where thumbnail images preceding and following the specified thumbnail image are desired to be viewed, for example a case where picture taking times of the display object data are not distant from each other. Incidentally, while in the example of FIG. 15, not only an image group of a specified thumbnail image but also an image group immediately preceding the image group of the specified thumbnail image is included in an object range, the image group of the specified thumbnail image and an image group immediately following the image group of the specified thumbnail image may of course be included in an object range.

Also in this case, of pieces of image data set as the object range, pieces of image data that have longest picture taking intervals and are equal in number to the number (nine) of images simultaneously displayable at the time of list display are set as display object data. Thumbnail images of the set display object data are displayed. By specifying a displayed thumbnail image, thumbnail images of image data having picture taking times closer to that of the specified thumbnail image (than the other thumbnail images) are displayed. Hence, in searching the 96 pieces of image data recorded on the recording medium 42 for the 85th piece of image data, the 85th piece of image data can be reached by a minimum of three operations or so. It is thus possible to reduce a number of operations as compared with the conventional example that requires at least 10 scroll operations as described above with reference to FIG. 3. In addition, in changing the list display, it suffices only to specify a desired thumbnail image, which is an easy operation, and unlike the example of FIG. 3, a scroll function is not required. It is therefore possible to reduce cost, manufacturing processes and the like.

It is to be noted that the image data in the above description may be still image data or moving image data. In the case of MPEG (Moving Picture Experts Group) 2 moving image data, for example, a thumbnail image of an I-picture at a start or a typical I-picture specified by user operation or image recognition processing is used. Further, the image data is not limited to image data and may be other data as long as there is image data to be used at the time of list display, such as thumbnail images or the like.

Further, while the recording medium 42 is described as a recording medium removable from the picture taking apparatus 41 in the above description, the recording medium 42 may be for example a recording medium built in the picture taking apparatus 41, and further, list display may be made using data recorded on the hard disk (recording medium) of the PC 44 connected to the network 43. Incidentally, in the case of the hard disk of the PC 44 connected to the network 43, specified data is obtained via the external I/F 59 and the network 43.

Furthermore, while the above description is made by using a picture taking apparatus, the present invention is applied to PDAs (Personal Digital Assistants), portable telephones, personal computers and the like. The present invention is also applied to an information processing system of FIG. 16, for example.

Figure 16:
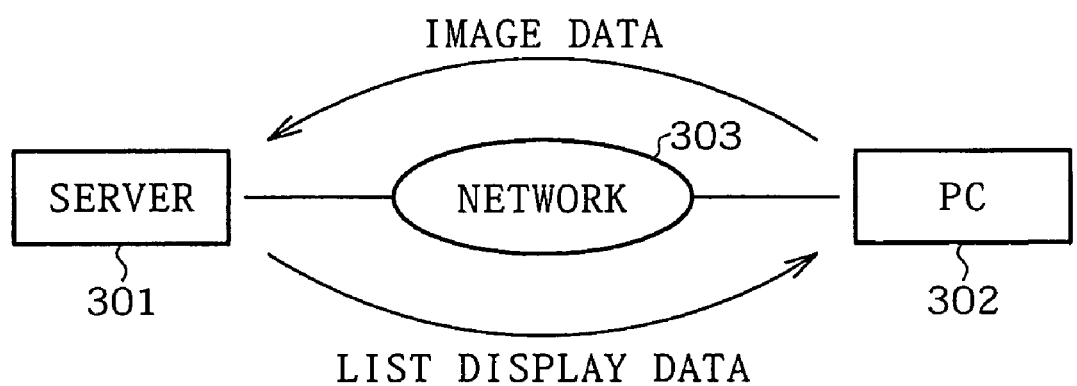
FIG. 16 is a diagram showing an example of configuration of an information processing system according to the present invention.

FIG. 16 shows a configuration of the information processing system to which the present invention is applied. In FIG. 16, a server 301 is connected to a PC (Personal Computer) 302 via a network 303 such as the Internet, an intranet or the like.

The PC 302 transmits image data recorded on a built-in hard disk to the server 301 to register the image data with the server 301. Then, the PC 302 connects to the server 301 using browser software or the like, requests a list display of image data registered with the server 301, receives list display data transmitted from the server 301 via the network 303, interprets the received list display data, and then displays the list display on a monitor or the like.

The server 301 is basically of the same configuration as the picture taking apparatus 41 described above with reference to FIG. 4 except that the processing unit for performing picture taking processing and the processing unit for performing display control are omitted in the server 301. Therefore description in the following will be made regarding the configuration of the picture taking apparatus 41 in FIG. 4 as the configuration of the server 301. Incidentally, the picture taking apparatus 41 may be used as the server. While in the case of the picture taking apparatus 41 of FIG. 4, a user instruction is inputted via the operating unit 56, an instruction from a user of the PC 302 is inputted via the network 303 and an external I/F 59 into the server 301 in FIG. 16.

The server 301 inputs (receives) image data from the PC 302 via the network 303 and the external I/F 59. The server 301 for example controls a medium I/F 54 to register (record) the image data on a recording medium 42. When receiving a request for list display of image data from the PC 302 via the network 303 by the external I/F 59, the server 301 generates list display data of the image data requested by the PC 302 as described above with reference to FIG. 7.

Specifically, the server 301 sets an object range in the image data recorded on the recording medium 42 on the basis of the request from the PC 302, obtains picture taking intervals of pieces of image data set as the object range, sets, as display object data, pieces of data that have longest picture taking intervals among the pieces of image data in the object range and are equal in number to a number (for example nine) of images simultaneously displayable at the time of list display, and generates list display data in which thumbnail images of the set display object data are arranged in order of picture taking date and time. Then the server 301 controls the external I/F 59 to transmit the generated list display data to the PC 302 via the network 303.

Thus, the list display is made on the PC 302 using browser software or the like. It is to be noted that while only one server and one PC are shown in the example of FIG. 16, an arbitrary number of servers, PCs and the like are connected to the network 303. Further, not only servers and PCS but also picture taking apparatus may be connected to the network. In this case, image data from a picture taking apparatus may be registered with a server, a list display of registered image data may be generated in the server, and an image of the generated list display data may be displayed on a PC.

As described above, the present invention is also applicable to the server 301 that provides service of registering image data from a user for viewing. Thus, even when many pieces of image data are registered with the server 301, the user of the PC 302 can readily view desired image data.

The series of processes described above can be carried out not only by hardware but also by software. When the series of processes is to be carried out by software, a program including the software is installed from a program storing medium onto a computer incorporated in special hardware, or a general-purpose personal computer that can perform various functions by installing various programs thereon, for example.

As shown in FIG. 4, the program storing medium storing the program to be installed on a computer and brought into a state of being executable by the computer includes the recording medium 42 formed by a removable recording medium (packaged medium) including a magnetic disk (including flexible disks), an optical disk (including CD-ROM (Compact Disc-Read Only Memory) and DVD (Digital Versatile Disc)), a magneto-optical disk (including MD (Mini-Disc) (trademark)), a semiconductor memory or the like, or includes the flash ROM 73 or the like that stores the program temporarily or permanently.

It is to be noted that in the present specification, the steps shown in the flowcharts include not only processes carried out in time series in the described order but also processes carried out in parallel or individually and not necessarily in time series.

While preferred embodiments of the present invention have been described using specific terms, such description is for illustrative purposes only, and it is to be understood that changes and variations may be made without departing from the spirit or scope of the following claims.

What is claimed is:

1. An information processing apparatus for making list display of data recorded on a recording medium, said information processing apparatus comprising:

an obtaining unit for obtaining picture taking date and time information of the data recorded on said recording medium;

a range setting unit for setting a data range in which display object data as objects for said list display is obtained from within said data on a basis of said picture taking date and time information obtained by said obtaining unit;

a picture taking interval calculating unit for obtaining a picture taking interval of each piece of data in said data range set by said range setting unit;

a display object setting unit for setting, as said display object data, pieces of data that have longest said picture taking intervals obtained by said picture taking interval calculating unit among pieces of data in said data range set by said range setting unit and are not more than a number of images simultaneously displayable on said list display; and a data generating unit for generating list display data including images of said display object data set by said display object setting unit;

wherein said display object setting unit sets some of the picture taking intervals obtained by the picture taking interval calculating unit as calculation objects, calculates an average value of the picture taking intervals of the calculation objects, and set the pieces of data with longer picture taking intervals than the average value as display candidates, repeatedly until the number of the display candidates becomes smaller than the number of images simultaneously displayable, and wherein said display object setting unit sets the picture taking intervals of the pieces of data not specified as display candidates in a previous instance but specified as display candidates in a current instance as calculation objects when the number of the display candidates is larger than the number of images simultaneously displayable.

2. The information processing apparatus as claimed in claim 1, further comprising an image selecting unit for selecting one image among said images being put on said list display on a basis of an operation by a user, wherein said range setting unit sets a range from a piece of display object data corresponding to said one image selected by said image selecting unit to data preceding a next piece of display object data as a data range in which display object data as objects for a next list display is obtained.

3. The information processing apparatus as claimed in claim 1, further comprising an image selecting unit for selecting one image among said images being put on said list display on a basis of an operation by a user, wherein said range setting unit sets a range from a piece of display object data preceding a piece of display object data corresponding to said one image selected by said image selecting unit to data preceding a piece of display object data following the piece of display object data corresponding to said one image as a data range in which display object data as objects for a next list display is obtained.

4. The information processing apparatus as claimed in claim 1, further comprising a data number determining unit for determining whether a number of the pieces of data in said data range set by said range setting unit is not larger than the number of images simultaneously displayable on said list display, wherein said display object setting unit sets all the pieces of data in said data range as said display object data when said data number determining unit determines that the number of the pieces of data in said data range is not larger than the number of images simultaneously displayable on said list display.

5. The information processing apparatus as claimed in claim 1, further comprising an equal number determining unit for determining whether the number of said display candidates is equal to the number of images simultaneously displayable on said list display when said display number determining unit determines that the number of said display candidates is not larger than the number of images simultaneously displayable on said list display; and when said equal number determining unit determines that the number of said display candidates is not equal to the number of images simultaneously displayable on said list display, said calculation object setting unit sets picture taking intervals of data specified by said display candidate specifying unit as said display candidates last time but not specified as said display candidates this time among said picture taking intervals obtained by said picture taking interval calculating unit as the picture taking intervals of said calculation objects.

6. The information processing apparatus as claimed in claim 1, further comprising a display control unit for controlling display of said list display data generated by said data generating unit.

7. The information processing apparatus as claimed in claim 1, further comprising a data transmitting unit for transmitting said list display data generated by said data generating unit via a network in response to a request from another information processing apparatus connected via said network.

8. The information processing apparatus as claimed in claim 1, further comprising:

a data input unit for inputting said data from another information processing apparatus via a network; and a recording unit for recording said data inputted by said data input unit onto said recording medium.

9. An information processing method for making list display of data recorded on a recording medium, said information processing method comprising:

an obtaining step of obtaining picture taking date and time information of data recorded on said recording medium;

a range setting step of setting a data range in which display object data as objects for said list display is obtained from within said data on a basis of said picture taking date and time information obtained by a process of said obtaining step;

a picture taking interval calculating step of obtaining a picture taking interval of each piece of data in said data range set by a process of said range setting step;

a display object setting step of setting, as said display object data, pieces of data that have longest said picture taking intervals obtained by a process of said picture taking interval calculating step among pieces of data in said data range set by the process of said range setting step and are not more than a number of images simultaneously displayable on said list display; and a data generating step of generating list display data including images of said display object data set by a process of said display object setting step;

wherein said display object setting step sets some of the picture taking intervals obtained by the picture taking interval calculating unit as calculation objects, calculates an average value of the picture taking intervals of the calculation objects, and set the pieces of data with longer picture taking intervals than the average value as display candidates, repeatedly until the number of the display candidates becomes smaller than the number of images simultaneously displayable, and wherein said display object setting step sets the picture taking intervals of the pieces of data not specified as display candidates in a previous instance but specified as display candidates in a current instance as calculation objects when the number of the display candidates is larger than the number of images simultaneously displayable.

10. The information processing method as claimed in claim 9, further comprising a display control step of controlling display of said list display data generated by a process of said data generating step.

11. The information processing method as claimed in claim 9, further comprising a data transmitting step of transmitting said list display data generated by a process of said data generating step via a network in response to a request from another information processing apparatus connected via said network.

12. The information processing method as claimed in claim 9, further comprising:
   a data input step of inputting said data from another information processing apparatus via a network; and
   a recording step of recording said data inputted by a process of said data input step onto said recording medium.

13. A computer program product for making a computer perform a process for list display of images of image data is recorded, said computer program product stored on a computer readable medium and including program code for performing steps comprising:
   an obtaining step of obtaining picture taking date and time information of data recorded on said recording medium;
   a range setting step of setting a data range in which display object data as objects for said list display is obtained from within said data on a basis of said picture taking date and time information obtained by a process of said obtaining step;
   a picture taking interval calculating step of obtaining a picture taking interval of each piece of data in said data range set by a process of said range setting step;
   a display object setting step of setting, as said display object data, pieces of data that have longest said picture taking intervals obtained by a process of said picture taking interval calculating step among pieces of data in said data range set by the process of said range setting step and are not more than a number of images simultaneously displayable on said list display; and
   a data generating step of generating list display data including images of said display object data set by a process of said display object setting step;
   wherein said display object setting step sets some of the picture taking intervals obtained by the picture taking interval calculating unit as calculation objects, calculates an average value of the picture taking intervals of the calculation objects, and set the pieces of data with longer picture taking intervals than the average value as display candidates, repeatedly until the number of the display candidates becomes smaller than the number of images simultaneously displayable, and
   wherein said display object setting step sets the picture taking intervals of the pieces of data not specified as display candidates in a previous instance but specified as display candidates in a current instance as calculation objects when the number of the display candidates is larger than the number of images simultaneously displayable.

14. A computer program product for making a computer perform a process for list display of images of image data, said computer program product stored on computer readable medium and including program code for performing steps comprising:
   an obtaining step of obtaining picture taking date and time information of data recorded on said recording medium;
   a range setting step of setting a data range in which display object data as objects for said list display is obtained from within said data on a basis of said picture taking date and time information obtained by a process of said obtaining step;
   a picture taking interval calculating step of obtaining a picture taking interval of each piece of data in said data range set by a process of said range setting step;
   a display object setting step of setting, as said display object data, pieces of data that have longest said picture taking intervals obtained by a process of said picture taking interval calculating step among pieces of data in said data range set by the process of said range setting step and are not more than a number of images simultaneously displayable on said list display; and
   a data generating step of generating list display data including images of said display object data set by a process of said display object setting step;
   wherein said display object setting step sets some of the picture taking intervals obtained by the picture taking interval calculating unit as calculation objects, calculates an average value of the picture taking intervals of the calculation objects, and set the pieces of data with longer picture taking intervals than the average value as display candidates, repeatedly until the number of the display candidates becomes smaller than the number of images simultaneously displayable, and
   wherein said display object setting step sets the picture taking intervals of the pieces of data not specified as display candidates in a previous instance but specified as display candidates in a current instance as calculation objects when the number of the display candidates is larger than the number of images simultaneously displayable.

15. A picture taking apparatus for making a list display of images of image data recorded on a recording medium, said picture taking apparatus comprising:
   a picture taking unit for photographing a subject;
   a recording unit for recording image data of the subject photographed by said picture taking unit onto said recording medium;

an obtaining unit for obtaining picture taking date and time information of the data recorded on said recording medium;

a range setting unit for setting a data range in which display object data as objects for said list display is obtained from within said data on a basis of said picture taking date and time information obtained by said obtaining unit;

a picture taking interval calculating unit for obtaining a picture taking interval of each piece of data in said data range set by said range setting unit;

a display object setting unit for setting, as said display object data, pieces of data that have longest said picture taking intervals obtained by said picture taking interval calculating unit among pieces of data in said data range set by said range setting unit and are not more than a number of images simultaneously displayable on said list display;

a data generating unit for generating list display data including images of said display object data set by said display object setting unit; and a display control unit for controlling display of said list display data generated by said data generating unit;

wherein said display object setting unit sets some of the picture taking intervals obtained by the picture taking interval calculating unit as calculation objects, calculates an average value of the picture taking intervals of the calculation objects, and set the pieces of data with longer picture taking intervals than the average value as display candidates, repeatedly until the number of the display candidates becomes smaller than the number of images simultaneously displayable, and wherein said display object setting unit sets the picture taking intervals of the pieces of data not specified as display candidates in a previous instance but specified as display candidates in a current instance as calculation objects when the number of the display candidates is larger than the number of images simultaneously displayable.

* * * * *